(12) United States Patent
Ishikawa et al.

(10) Patent No.: US 11,480,732 B2
(45) Date of Patent: Oct. 25, 2022

(54) OPTICAL CONNECTION STRUCTURE

(71) Applicant: Nippon Telegraph and Telephone Corporation, Tokyo (JP)

(72) Inventors: Hiroshi Ishikawa, Tokyo (JP); Kota Shikama, Tokyo (JP); Yuko Kawajiri, Tokyo (JP); Atsushi Aratake, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/288,079

(22) PCT Filed: Nov. 19, 2019

(86) PCT No.: PCT/JP2019/045210
§ 371 (c)(1),
(2) Date: Apr. 23, 2021

(87) PCT Pub. No.: WO2020/116146
PCT Pub. Date: Jun. 11, 2020

(65) Prior Publication Data
US 2021/0373232 A1   Dec. 2, 2021

(30) Foreign Application Priority Data

Dec. 3, 2018   (JP) .............................. JP2018-226286

(51) Int. Cl.
*G02B 6/124*     (2006.01)
*G02B 6/02*      (2006.01)
(Continued)

(52) U.S. Cl.
CPC ............. *G02B 6/124* (2013.01); *G02B 6/021* (2013.01); *G02B 6/02209* (2013.01); *G02B 6/34* (2013.01);
(Continued)

(58) Field of Classification Search
CPC .... G02B 6/124; G02B 6/021; G02B 6/02209; G02B 6/34; G02B 2006/12107; G02B 2006/12147; G02B 6/125
See application file for complete search history.

(56) References Cited

U.S. PATENT DOCUMENTS 5,835,659 A * 11/1998 Ota ..................... G02B 6/3652
                                                         385/83
5,993,075 A * 11/1999 Huang ................. G02B 6/4245
                                                         385/94
(Continued)

FOREIGN PATENT DOCUMENTS

JP      2015118372 A    6/2015
JP      2016167005 A    9/2016

OTHER PUBLICATIONS

Masao Kawauchi, "Planar lightwave circuit device," Journal of the IEICE C-II vol. J 81—C-II No. 6, pp. Jun. 1998, pp. 513-523.
(Continued)

*Primary Examiner* — Ellen E Kim
(74) *Attorney, Agent, or Firm* — Slater Matsil, LLP

(57) ABSTRACT

An optical connection structure includes a PLC that is an optical waveguide chip including an optical waveguide and at least one groove formed on a substrate, and at least one optical fiber that is fitted into the at least one groove of the PLC. The PLC includes the optical waveguide, at least one grating coupler that is optically connected to the optical waveguide, and the at least one groove formed at a position in a vicinity of the at least one grating coupler in a cladding layer in which the optical waveguide is formed. An optical fiber of the at least one optical fiber is fitted into a groove of the at least one groove such that an end surface of the optical fiber is located in a vicinity of a grating coupler of the at least one grating coupler, the optical fiber being optically connected to the grating coupler.

16 Claims, 34 Drawing Sheets

(51) Int. Cl.
     *G02B 6/34*      (2006.01)
     *G02B 6/12*      (2006.01)

(52) U.S. Cl.
     CPC .............. *G02B 2006/12107* (2013.01); *G02B 2006/12147* (2013.01)

(56) References Cited

U.S. PATENT DOCUMENTS

| | | | |
|---|---|---|---|
| 6,845,184 B1 * | 1/2005 | Yoshimura | H01L 23/48 385/9 |
| 8,116,624 B1 * | 2/2012 | Wach | H04B 10/073 398/28 |
| 11,397,282 B1 * | 7/2022 | Gross | G02B 1/04 |
| 2014/0308004 A1 * | 10/2014 | Doany | G02B 6/4214 427/446 |
| 2015/0177459 A1 | 6/2015 | Van Campenhout et al. | |
| 2016/0246009 A1 * | 8/2016 | Jiang | G02B 6/124 |
| 2018/0217333 A1 * | 8/2018 | Watté | G02B 6/3885 |
| 2018/0231732 A1 | 8/2018 | Paquet et al. | |
| 2018/0321451 A1 | 11/2018 | Zhao et al. | |
| 2018/0335558 A1 | 11/2018 | Fini et al. | |

OTHER PUBLICATIONS

Dirk Taillaertet al., "Grating Couplers for Coupling between Optical Fibers and Nanophotonic Waveguides," Japanese Journal of Applied Physics, vol. 45, No. 8A, 2006, pp. 6071-6077.

* cited by examiner

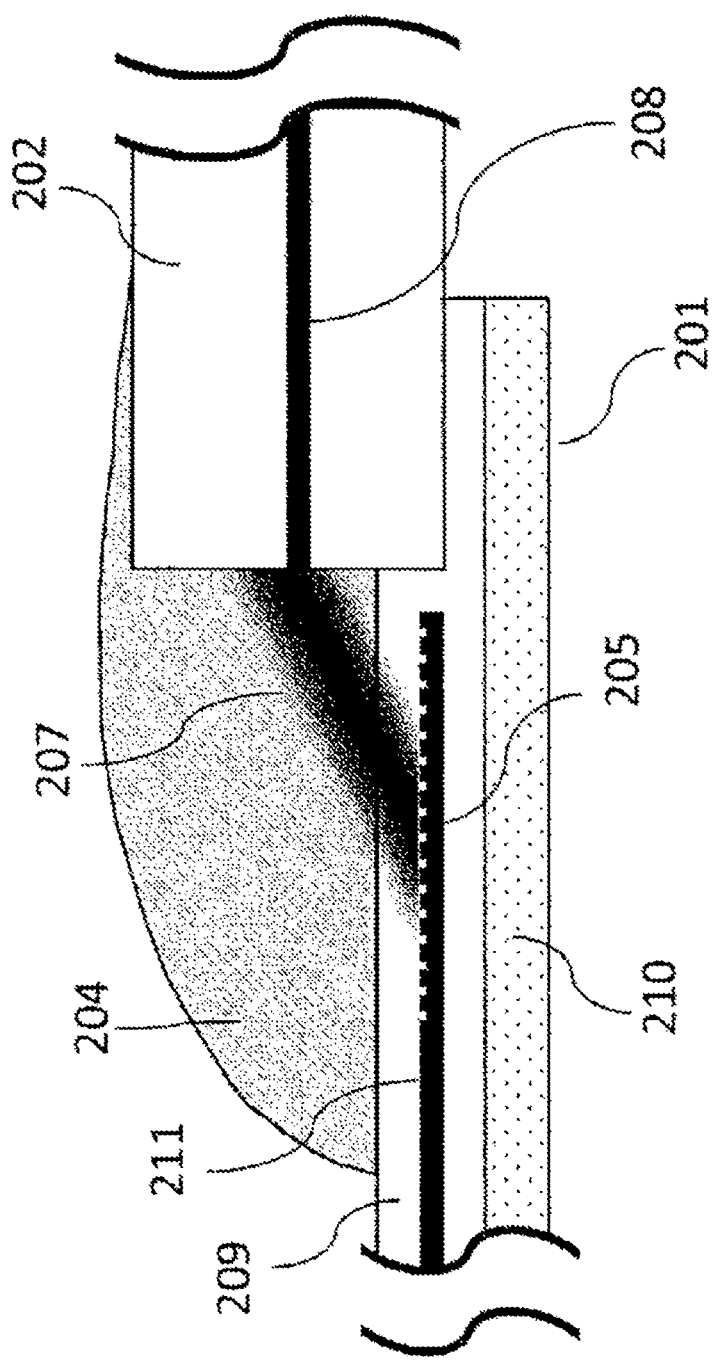
Fig. 4B
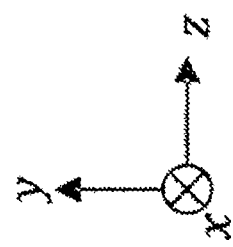

OPTICAL CONNECTION STRUCTURE

CROSS-REFERENCE TO RELATED APPLICATIONS

This application is a national phase entry of PCT Application No. PCT/JP2019/045210, filed on Nov. 19, 2019, which claims priority to Japanese Application No. 2018-226286, filed on Dec. 3, 2018, which applications are hereby incorporated herein by reference.

TECHNICAL FIELD

The present invention relates to a connection structure between an optical waveguide chip and an optical fiber in the technical field in which processing of optical signals such as optical communication and optical sensing is required.

BACKGROUND

Rapid development has continued in the industrial fields in which optical signal processing techniques such as optical communication and optical sensing are used along with related fields. Similarly to the optical signal processing techniques, rapid development has continued in electronic circuit techniques, which have often been used in combination with the optical signal processing techniques. However, optical signal processing techniques have some difficulties as compared with electronic circuit techniques. The difficulties include size reduction and simple connectivity.

Because miniaturization leads directly to a performance improvement on the basis of the scaling rule, miniaturization has been very actively promoted in the electronic circuit techniques focused on silicon. However, in the optical signal processing techniques, the size of system is very large in a spatial optical system. Also, in planar lightwave circuits (PLCs), in which a smaller-sized system can be implemented than the spatial optical system, a waveguide, which is the most basic optical element, still have a size of order of several µm to several hundreds of nm due to cut-off requirements, and the size of device tends to be larger than that implemented by electronic circuit techniques.

Moreover, in terms of simple connectivity, in the electronic circuit techniques, it is possible to very easily transmit signals simply by connecting a conductor such as metal in low-frequency bands, and pluggable connection techniques including RF connector have been developed for use in high-frequency bands as well. However, in the optical signal processing techniques, it is not possible to implement satisfactory connectivity merely by connecting media for transmitting optical signals. In order to obtain satisfactory connectivity in the optical signal processing techniques, highly precise alignment between devices is essential, and in a case of a device provided with a single-mode waveguide, for example, alignment with a precision of sub-µm order may be required depending on a material and design.

Generally, the optical signal processing is unlikely to be completed simply with a PLC provided with a single-mode waveguide, and in most cases, input and output of optical signals are implemented by connecting an optical fiber to a PLC. At this time, a single mode optical fiber is very often used for the PLC provided with the single-mode waveguide. Specifically, optical connection between single-mode waveguides is needed, and alignment with a precision of sub-µm order is still needed.

Examples of such connection between the PLC provided with the single-mode waveguide and the single-mode optical fiber include two representative methods for obtaining optical coupling without using a microlens or the like. One method involves optical coupling using a grating coupler in a direction that is substantially perpendicular with respect to a waveguide direction of the PLC, and the other method involves direct optical coupling on an end surface of the PLC.

FIG. 23 is a perspective view illustrating an example of optical coupling in a direction that is substantially perpendicular with respect to a waveguide direction of a PLC using a grating coupler disclosed in Non Patent Literature 1. In the example illustrated in FIG. 23 in which a PLC and an optical fiber are bonded to each other, a silicon-based PLC 1201 and an optical fiber 1202 form optical bonding. The silicon-based PLC 1201 has a structure in which an optical waveguide 1203 is formed on an Si substrate 1208. The optical waveguide 1203 includes a cladding layer 1203a made of $SiO_2$ and a core 1203b formed in the cladding layer 1203a and made of Si. In FIG. 23, the optical waveguide 1203 constitutes a Mach-Zehnder interferometer, which is just an example, and it may constitute any circuit.

The silicon-based PLC 1201 and the optical fiber 1202 are physically bonded to each other with an optical adhesive 1204. A grating coupler 1207 is connected to the optical waveguide 1203, and the optical waveguide 1203 is optically connected to the optical fiber 1202 via the grating coupler 1207. Generally, in order to employ such a configuration, the optical fiber 1202 is positioned near the grating coupler 1207, an optimal position of the optical fiber 1202 is determined through active alignment, and the optical fiber 1202 is then fixed using the optical adhesive 1204. Such a configuration is often found in a silicon-based PLC.

FIG. 24 is a perspective view illustrating an example of direct optical coupling on an end surface of a PLC disclosed in Non Patent Literature 2. In the example of the bonding between the PLC and the optical fiber illustrated in FIG. 24, a quartz-based PLC 1301 and an optical fiber 1302 form optical coupling. The quartz-based PLC 1301 has a structure in which an optical waveguide 1303 is formed on an Si substrate 1307. The optical waveguide 1303 includes a cladding layer 1303a made of non-doped $SiO_2$ and a core 1303b formed in the cladding layer 1303a and made of $SiO_2$ to which a Ge dopant is added. In FIG. 24, the optical waveguide 1303 constitutes a Mach-Zehnder interferometer, which is just an example, and it may constitute any circuit.

The glass block 1306 and the quartz-based PLC 1301 are bonded to each other in advance, and an optical fiber 1302 and a fiber block 1305 are bonded to each other in advance. These bonding between the glass block 1306 and the quartz-based PLC 1301 and bonding between the optical fiber 1302 and the optical fiber 1305 are physical bonding and are formed prior to the optical bonding. Generally, in order to perform the optical bonding, a core end surface of the optical fiber 1302 bonded to the fiber block 1305 is positioned near an end surface of a core 1303b of the optical waveguide 1303 on an end surface of the quartz-based PLC 1301, an optimal position of the optical fiber 1302 is determined through active alignment, and the fiber block 1305 is then fixed using an optical adhesive 1304. Such a configuration is often found in a quartz-based PLC.

In the structures illustrated in FIGS. 23 and 24, the optical connection between the PLC and the optical fiber is aligned through active alignment as described above. The active alignment is an aligning method, typically using a dedicated device, for adjusting the position while light is caused to pass through the PLC and the optical fiber, and the light transmitted is observed. In the method, the PLC and the optical fiber are adhered to each other when the position is considered to be most appropriate from the results of the observation of the transmitted light. In the active alignment, the adhesion is generally performed by observing the intensity of the transmitted light and determining the most appropriate position when the maximum intensity of the transmitted light is observed.

On the other hand, there is also a concept of passive alignment. In the passive alignment, it is proposed that aligning is performed through fitting or abutting by using physical structures of elements to be positioned without a need of a dedicated device and without a need of transmission and observation of light. However, no developed passive alignment techniques are currently available for the optical bonding between the PLC and the optical fiber.

As described above, the optical connection between the PLC and the optical fiber implemented in the examples illustrated in FIGS. 23 and 24 requires the active alignment. However, the active alignment requires a complicated installation device and also has problems of a long installation time and high installation cost. Although such problems are solved by the passive alignment, an appropriate passive alignment method between the PLC and the optical fiber has not yet been established.

CITATION LIST

Non Patent Literature

Non Patent Literature 1: Dirk Taillaert et al, "Gratings Couplers for Coupling between Optical Fibers and Nanophotonic Waveguides", Japanese Journal of Applied Physics, Vol. 45, No. 8A, p. 6071 to 6077, 2006

Non Patent Literature 2: Masao Kawachi, "Planar Lightwave Circuit Devices", Journal of the Institute of Electronics, Information and Communication Engineers, C-II, Vol. J81-CII, No. 6, pp. 513 to 523, 1998.

SUMMARY

Technical Problem

Embodiments of the present invention were made in view of the aforementioned problems, and an object thereof is to provide an optical connection structure that implements connection between an optical waveguide chip and an optical fiber by using passive alignment and that can reduce an installation time and installation cost for the connection between the optical waveguide chip and the optical fiber.

Means for Solving the Problem

An optical connection structure according to embodiments of the present invention includes: an optical waveguide chip that has an optical waveguide formed on a substrate, at least one grating coupler optically connected to the optical waveguide, and at least one groove; and at least one optical fiber that is fitted into the at least one groove of the optical waveguide chip, in which the at least one groove is formed at a position in a vicinity of the at least one grating coupler in a cladding layer in which the optical waveguide is formed, and an optical fiber of the at least one optical fiber is disposed such that an end surface of the optical fiber is located in a vicinity of a grating coupler of the at least one grating coupler, the optical fiber being optically connected to the grating coupler.

Also, in one configuration example of the optical connection structure according to embodiments of the present invention, the optical fiber is in a state of being fitted into the groove and caused to adhere to the optical waveguide chip with an optical adhesive.

Also, in one configuration example of the optical connection structure according to embodiments of the present invention, the optical adhesive is provided so as to cover a distal end of the optical fiber fitted into the groove and cover the grating coupler optically connected to the optical fiber.

Also, in one configuration example of the optical connection structure according to embodiments of the present invention, a groove of the at least one groove into which the optical fiber is fitted is formed from the position in the vicinity of the grating coupler to a position at which the groove reaches an end surface of the optical waveguide chip along an in-plane direction of the cladding layer.

Also, in one configuration example of the optical connection structure according to embodiments of the present invention, a groove of the at least one groove into which the optical fiber is fitted is formed so as to extend from the position in the vicinity of the grating coupler along an in-plane direction of the cladding layer and end at a position at which the groove does not reach an end surface of the optical waveguide chip, and the optical fiber is fitted into the groove so as to be inclined with respect to a surface of the optical waveguide chip on which the grating coupler is formed.

Also, in one configuration example of the optical connection structure according to embodiments of the present invention, the groove into which the optical fiber is fitted has a planar shape, in a top view, with a rectangular shape on a side closer to the grating coupler and an elliptical hemisphere shape on a side closer to the end surface of the optical waveguide chip, the planar shape being obtained by combining the rectangular shape and the elliptical hemisphere shape such that a width of the rectangular shape coincides with a shorter diameter of the elliptical hemisphere.

Also, in one configuration example of the optical connection structure according to embodiments of the present invention, at least one of the at least one optical fibers is a thermally-expanded core optical fiber, a lensed fiber, an obliquely cut fiber, a multiple-core fiber, or a multicore fiber.

Also, in one configuration example of the optical connection structure according to embodiments of the present invention, a groove of the at least one groove into which the optical fiber is fitted is formed so as to penetrate through the cladding layer up to a depth, at which a lower layer different from the cladding layer is exposed, the lower layer having an upper surface serving as a bottom surface of the groove.

Effects of Embodiments of the Invention

According to embodiments of the present invention, a groove is formed at a position on the optical waveguide chip in the vicinity of the grating coupler, and the optical fiber is fitted into the groove such that the end surface of the optical fiber is located in the vicinity of the grating coupler to optically connect the grating coupler and the optical fiber. According to embodiments of the present invention, at least a part of the positioning of the optical waveguide chip and the optical fiber can be implemented using passive alignment, and a need for a highly precise process of locating components is eliminated or mitigated in the installation, thereby an installation time and installation cost are decreased, improving a yield.

Also, according to embodiments of the present invention, the optical fiber, in a state of being fitted into the groove, is caused to adhere to the optical waveguide chip with the optical adhesive, thereby it is possible to implement stable optical connection between the optical waveguide chip and the optical fiber and to reduce the installation time and installation cost.

In addition, according to embodiments of the present invention, an optical adhesive is provided so as to cover the distal end of the optical fiber fitted into the groove and cover the grating coupler optically connected to the optical fiber, thereby it is possible to implement stable optical connection between the optical waveguide chip and the optical fiber, to reduce the installation time and installation cost, and to reduce a connection loss between the optical waveguide chip and the optical fiber.

Also, according to embodiments of the present invention, the groove fitted to the optical fiber is formed from the position in the vicinity of the grating coupler to the position at which the groove reaches the end surface of the optical waveguide chip, thereby it is possible to implement at least a part of the positioning of the optical waveguide chip and the optical fiber by using passive alignment while employing a physical position compatible with a structure obtained by known active alignment, reducing the installation time and installation cost.

Also, according to embodiments of the present invention, the groove fitted to the optical fiber is formed from the position in the vicinity of the grating coupler so as to end at the position at which the groove does not reach the end surface of the optical waveguide chip, and the optical fiber is fitted to the groove so as to be inclined with respect to the surface of the optical waveguide chip on which the grating coupler is formed, thereby it is possible to implement at least a part of the positioning of the optical waveguide chip and the optical fiber by using passive alignment, to reduce the installation time and installation cost, and to reduce a connection loss derived from an angular deviation between a light beam and the optical fiber, the light beam being incident on the grating coupler and emitted from the grating coupler.

Also, according to embodiments of the present invention, the groove fitted to the optical fiber is formed to have a planar shape in a top view, with a rectangular shape on the side close to the grating coupler and an elliptical hemisphere shape on the side close to the end surface of the optical waveguide chip, in which the rectangular shape and the elliptical hemisphere shape are combined such that the width of the rectangular shape coincides with the shorter diameter of the elliptical hemisphere, thereby it is possible to realize at least a part of the positioning of the optical waveguide chip and the optical fiber using passive alignment, to reduce the installation time and installation cost, to appropriately design the shape of the groove, to enhance mechanical stability and increase an amount of allowance for positional deviation at the time of installation, and to further reduce the installation time and installation cost.

Also, according to embodiments of the present invention, a thermally-expanded core optical fiber, a lensed fiber, an obliquely cut fiber, a multiple-core fiber, or a multicore fiber is employed for at least one of the optical fibers, it is possible to realize at least a part of the positioning of the optical waveguide chip and the optical fiber by using passive alignment, to reduce the installation time and installation cost, and to achieve further reduction of a connection loss in a case that the thermally-expanded core optical fiber, the lensed fiber, or the obliquely cut fiber is used, and to achieve further reduction of the installation time and installation cost in a case that the multiple-core fiber or the multicore fiber is used.

Also, according to embodiments of the present invention, the groove fitted to the optical fiber is formed to penetrate through the cladding layer up to a depth at which the lower layer different from the cladding layer is exposed such that the upper surface of the lower layer becomes the bottom surface of the groove, it is possible to realize at least a part of the positioning of the optical waveguide chip and the optical fiber by using passive alignment, to reduce the installation time and installation cost, and to achieve a further improvement of precision of the optical connection between the optical waveguide chip and the optical fiber, an improvement of yield, and reduction of a connection loss by using a highly precise mechanical structure derived from the layer structure.

BRIEF DESCRIPTION OF THE DRAWINGS

FIG. 4B is a sectional view of the optical connection structure before adhesion according to the second embodiment of the present invention.

DETAILED DESCRIPTION OF ILLUSTRATIVE EMBODIMENTS

In embodiments of the present invention, what kind of optical circuit a PLC (optical waveguide chip) has is not particularly limited. Although an optical circuit illustrated in the following embodiments is simply a simple Mach-Zehnder interferometer, this is just an example, and a possible form of the optical circuit is not limited to a Mach-Zehnder interferometer. In other words, embodiments of the present invention can be applied regardless of the type and the configuration of the optical circuit.

Further, materials constituting the PLC can be arbitrarily selected in embodiments of the present invention. Although it is possible to use an Si substrate for a support substrate and a cladding layer made of $SiO_2$ for a cladding layer in a quartz-based PLC, in addition to this, it is also possible to arbitrarily employ a PLC with a waveguide structure made of a dielectric material or a compound semiconductor material such as a $TaO_2/SiO_2$-based material or a lithium niobate-based material, a PLC made of a silicon photonics material, or the like, in embodiments of the present invention.

First Embodiment

Figure 1:
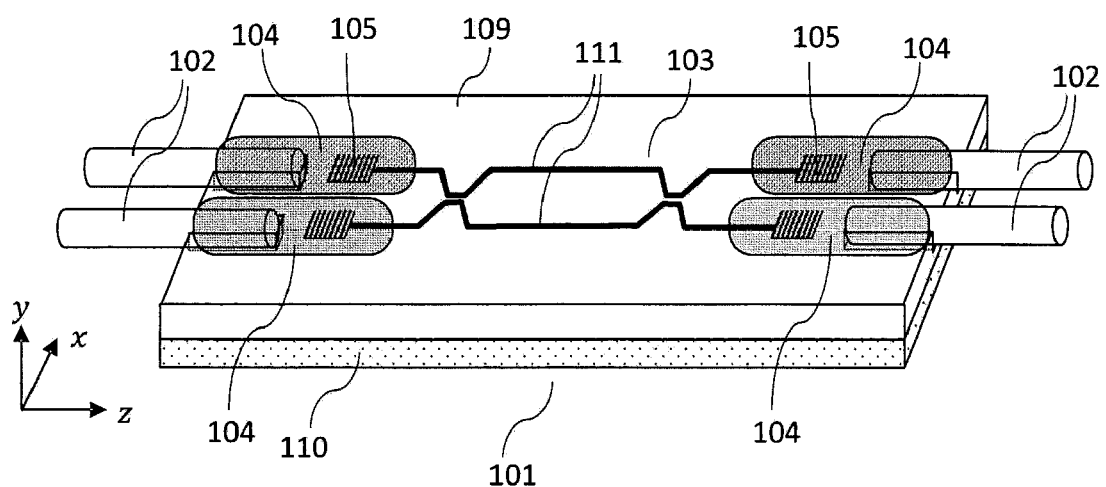
FIG. 1 is a schematic view illustrating an optical connection structure according to a first embodiment of the present invention.
Figure 2A:
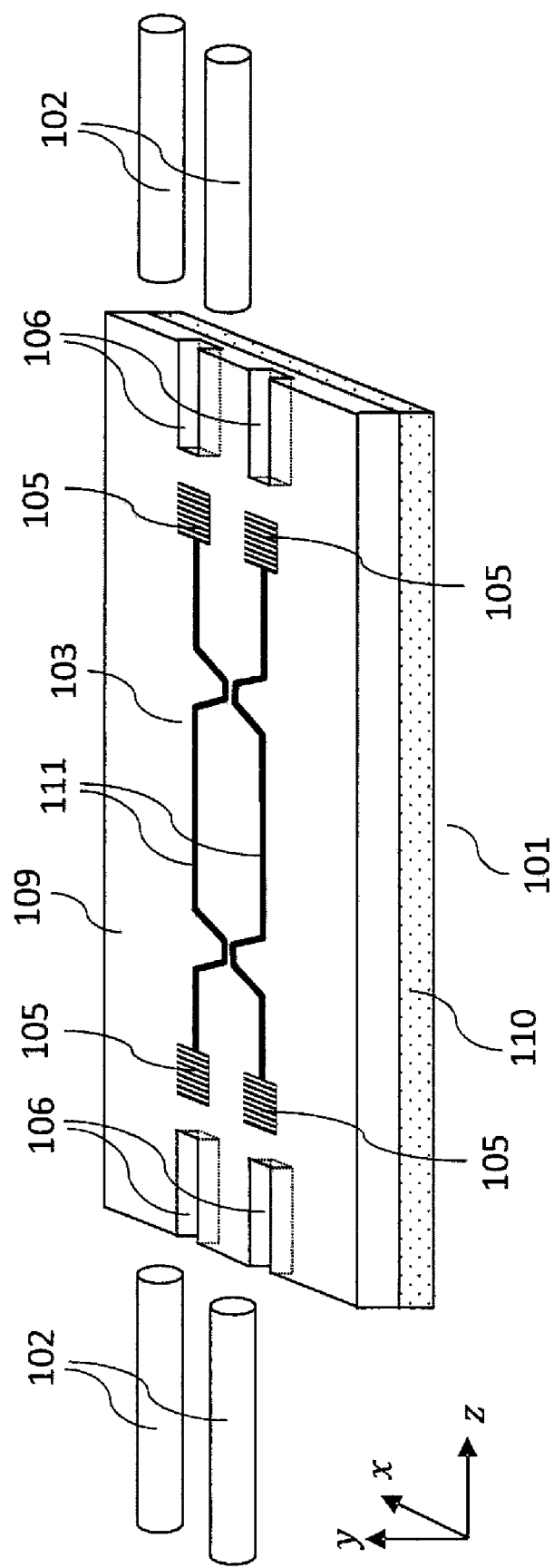
FIG. 2A is an exploded view of components of the optical connection structure before adhesion according to the first embodiment of the present invention.
Figure 2B:
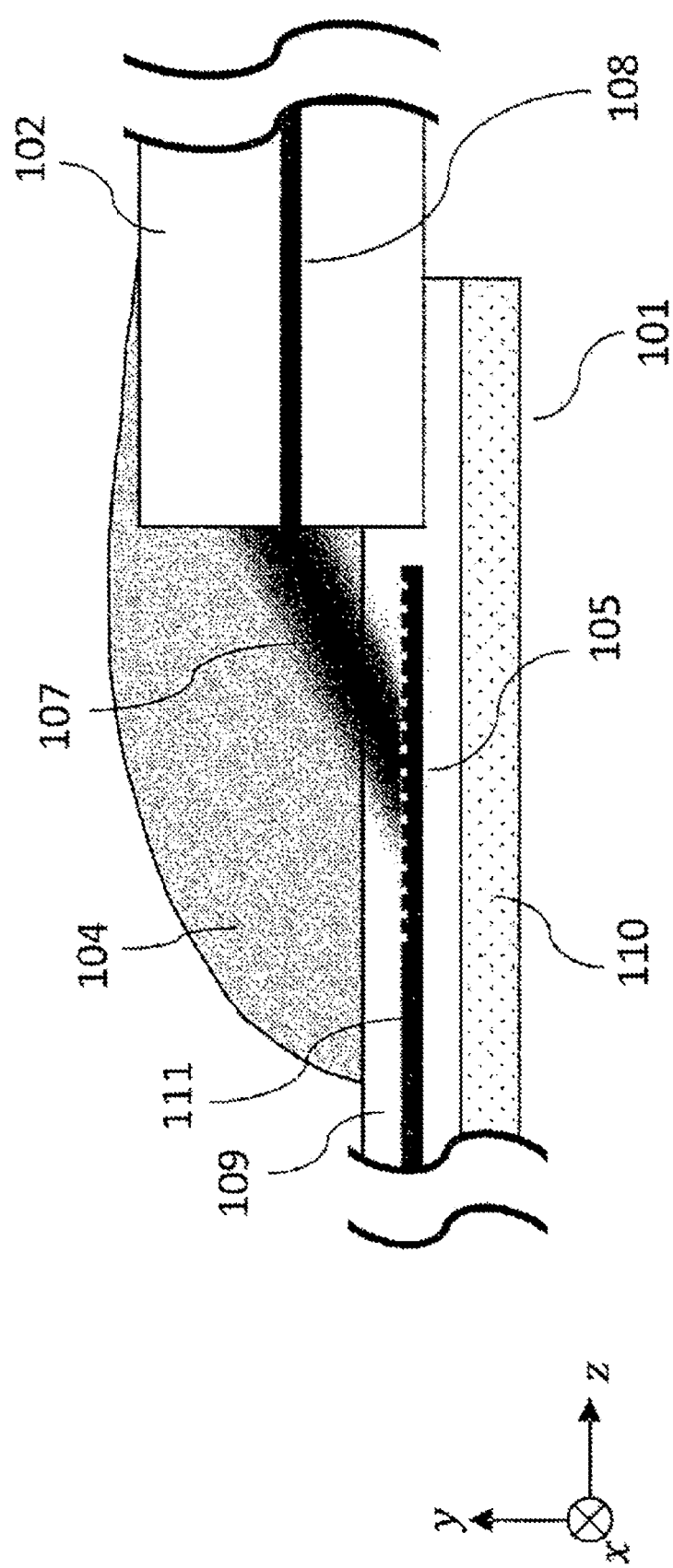
FIG. 2B is a sectional view of the optical connection structure before adhesion according to the first embodiment of the present invention.

Embodiments of the present invention will be described below with reference to the drawings. FIGS. 1, 2A, and 2B are schematic diagrams illustrating an optical connection structure according to a first embodiment of the present invention. FIG. 1 is a perspective view of the optical connection structure, FIG. 2A is an exploded view of components of the optical connection structure before adhesion, and FIG. 2B is a sectional view of the optical connection structure cut along a yz plane.

The PLC 101 that is an optical waveguide chip has a structure in which an optical waveguide 103 and a grating coupler 105 are formed on a substrate no. The optical waveguide 103 includes a cladding layer 109 and a core 111 formed in the cladding layer 109. Furthermore, a grating coupler 105 is formed in the cladding layer 109, and the optical waveguide 103 and the grating coupler 105 are optically connected. The adhering position of an optical fiber 102 is near the grating coupler 105 with an optical adhesive 104.

As is obvious from the exploded view of the components before adhesion illustrated in FIG. 2A, the optical waveguide 103 and the grating coupler 105 are formed on the PLC 101. Furthermore, a fitting groove 106 to be fitted to the optical fiber 102 is formed in the cladding layer 109 of the PLC 101 from a position in the vicinity of the grating coupler 105 to a position at which the fitting groove 106 reaches the end surface of the PLC 101 along an in-plane direction of the cladding layer 109. The fitting groove 106 is formed such that optimal optical coupling is obtained between the optical fiber 102 fitted into the fitting groove 106 and the grating coupler 105. This allows a physical aligning structure required for passive alignment to be implemented. Here, the position in the vicinity of the grating coupler 105 denotes a position at which the optical fiber 102 fitted into the fitting groove 106 can form a sufficient optical coupling with the grating coupler 105. Although the method for manufacturing the fitting groove 106 is not particularly limited, it is possible to produce the fitting groove 106 with a precision required for passive alignment even in a case that photolithography that is a typical PLC producing method is employed.

FIG. 2B is a sectional view of a state in which the optical fiber 102 is fitted into the fitting groove 106 in the PLC 101. An optical fiber core 108 is formed in the optical fiber 102. As described above, the optical fiber 102 is caused to adhere to the PLC 101 with an optical adhesive 104 in the state in which the optical fiber 102 is fitted into the fitting groove 106. With the aforementioned structure, optical coupling between the PLC 101 and the optical fiber 102 is established by the light beam 107 being emitted from the optical fiber 102 and being incident on the optical waveguide 103 via the grating coupler 105, or by light from the optical waveguide 103 being emitted as the light beam 107 from the grating coupler 105 and being incident on the optical fiber 102.

In general, the diameter of the optical fiber core 108, the cladding diameter of the optical fiber 102, the thickness of the cladding layer 109 in the PLC 101, and the position of the optical waveguide 103 in the cladding layer 109 in a y-axis direction (thickness direction) cannot be freely selected for certain commercial reasons or for convenience during manufacturing. However, using the structure according to the embodiment enables optical coupling between the optical waveguide 103 on the PLC 101 and the optical fiber core 108 of the optical fiber 102 by adjusting a coupling angle of the light beam 107 at the grating coupler 105 regardless of these physical dimensions.

Also, the PLC 101 and the optical fiber 102 can be aligned using the fitting groove 106 formed in the PLC 101. Although the methods for manufacturing the grating coupler 105 and the fitting groove 106 are not particularly designated in the present invention, the grating coupler 105 and the fitting groove 106 can be produced with high precision using photolithography, electron beam lithography, or the like, and the precision for a physical structure required to realize passive alignment can be secured.

Thus, according to the embodiment, the optical connection between the PLC 101 and the optical fiber 102 can be realized simply using passive alignment without using active alignment, and it is possible to reduce an installation time and installation cost as compared with the case in which active alignment is used.

Second Embodiment

Figure 3:
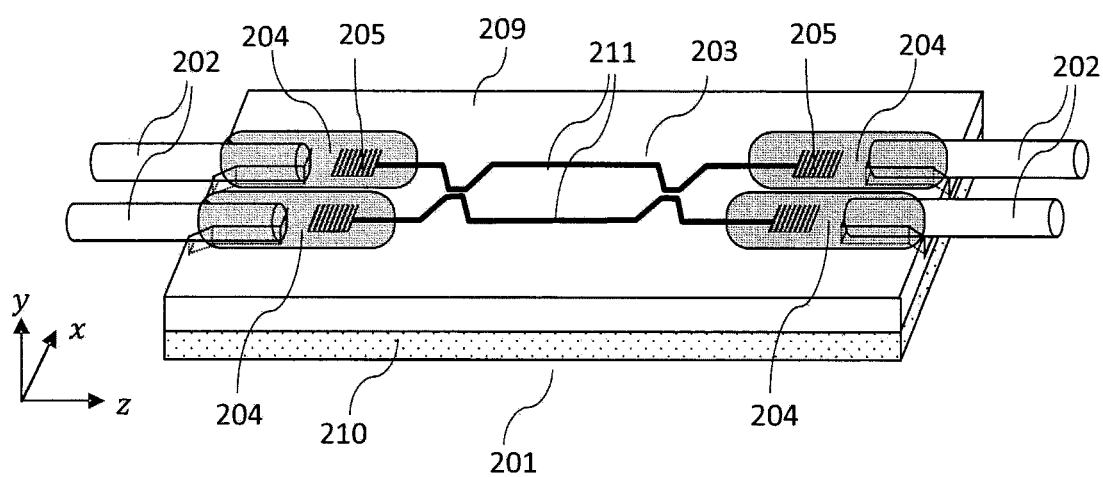
FIG. 3 is a schematic view illustrating an optical connection structure according to a second embodiment of the present invention.
Figure 4A:
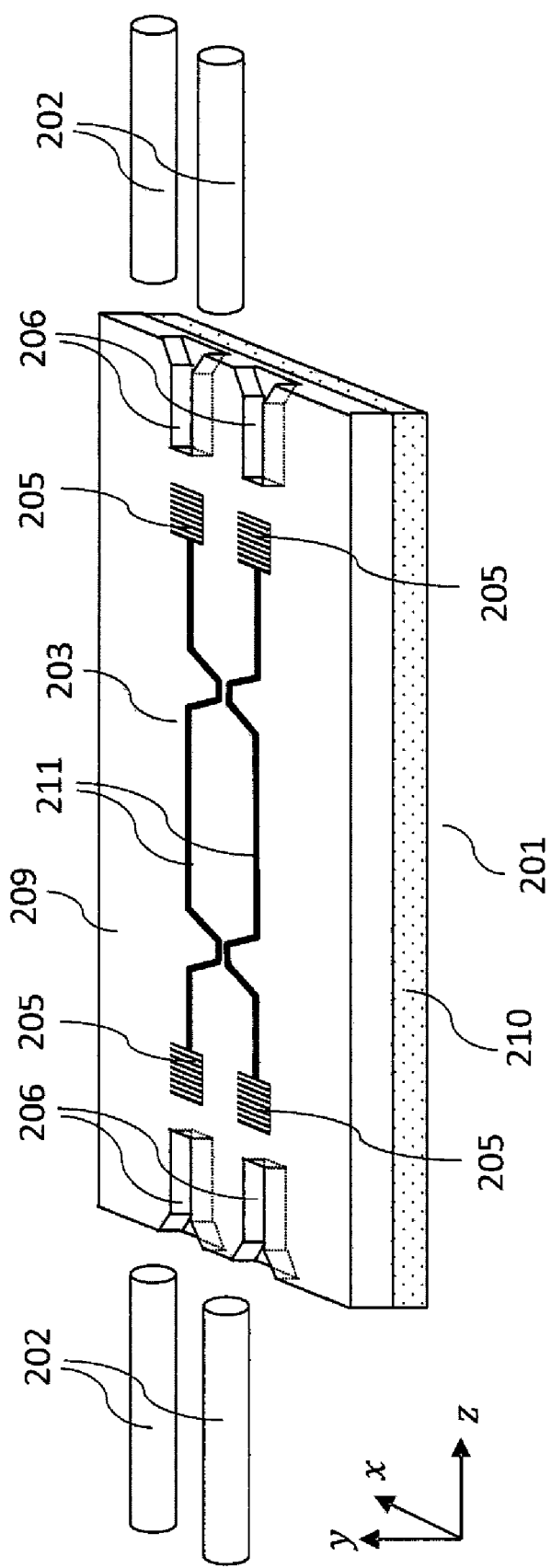
FIG. 4A is an exploded view of components of the optical connection structure before adhesion according to the second embodiment of the present invention.

Next, a second embodiment of the present invention will be described. FIGS. 3, 4A, and 4B are schematic views illustrating an optical connection structure according to the second embodiment of the present invention. FIG. 3 is a perspective view of the optical connection structure, FIG. 4A is an exploded view of components of the optical connection structure before adhesion, and FIG. 4B is a sectional view of the optical connection structure cut along a yz plane.

Similarly to the first embodiment, a PLC 201 that is an optical waveguide chip has a structure in which an optical waveguide 203 and a grating coupler 205 are formed on a substrate 210. The optical waveguide 203 includes a cladding layer 209 and a core 211 formed in the cladding layer 209. Further, a grating coupler 205 is formed in the cladding layer 209, and the optical waveguide 203 and the grating coupler 205 are optically connected to each other. The adhering position of an optical fiber 202 is near the grating coupler 205 with an optical adhesive 204.

As is obvious from the exploded view of components before adhesion illustrated in FIG. 4A, the optical waveguide 203 and the grating coupler 205 are formed on the PLC 201. Further, a fitting groove 206 to be fitted to the optical fiber 202 is formed in the cladding layer 209 in the PLC 201 from a position in the vicinity of the grating coupler 205 to a position at which the fitting groove 206 reaches an end surface of the PLC 201 along an in-plane direction of the cladding layer 209. The fitting groove 206 is formed such that optimal optical coupling is achieved between the optical fiber 202 fitted into the fitting groove 206 and the grating coupler 205.

A difference from the first embodiment is that the fitting groove 206 has a tapered guiding structure with a width gradually increasing toward the end surface of the PLC 201 in the vicinity of the end surface. A physical aligning structure required for passive alignment is realized by causing the optical fiber 202 to be fitted into the fitting groove 206. Although a method for manufacturing the fitting groove 206 is not particularly limited, it is possible to produce the fitting groove 206 with precision required for passive alignment even in a case in which photolithography that is a typical PLC producing method is employed.

FIG. 4B is a sectional view of a state in which the optical fiber 202 is fitted into the fitting groove 206 in the PLC 201. An optical fiber core 208 is formed in the optical fiber 202. As described above, the optical fiber 202 is caused to adhere to the PLC 201 with an optical adhesive 204 in a state in which the optical fiber 202 is fitted into the fitting groove 206. With the aforementioned structure, optical coupling between the PLC 201 and the optical fiber 202 is established by a light beam 207 being emitted from the optical fiber 202 and being incident on the optical waveguide 203 via the grating coupler 205 or by light from the optical waveguide 203 being emitted as the light beam 207 from the grating coupler 205 and being incident on the optical fiber 202.

In general, the diameter of the optical fiber core 208, the cladding diameter of the optical fiber 202, the thickness of the cladding layer 209 in the PLC 201, and the position of the optical waveguide 203 in the cladding layer 209 in a y-axis direction (thickness direction) cannot be freely selected for some commercial reasons or for convenience of manufacturing. However, using the structure according to the embodiment enables optical coupling between the optical waveguide 203 on the PLC 201 and the optical fiber core 208 of the optical fiber 202 by adjusting a coupling angle of the light beam 207 at the grating coupler 205 regardless of these physical dimensions.

Also, the PLC 201 and the optical fiber 202 can be aligned using the fitting groove 206 formed in the PLC 201. Although the method for manufacturing the grating coupler 205 and the fitting groove 206 is not particularly designated in the present invention, the grating coupler 205 and the fitting groove 206 can be produced with high precision using photolithography, electron beam lithography, or the like, and precision of a physical structure required to realize passive alignment can be secured.

Thus, according to the embodiment, the optical connection between the PLC 201 and the optical fiber 202 can be realized using only passive alignment without using active alignment similarly to the first embodiment, and it is possible to reduce an installation time and installation cost as compared with the case in which active alignment is used. Also, according to this embodiment, it is possible to increase error tolerance of passive alignment itself by using the fitting groove 206 provided with the guiding structure, and improvement of yield, further reduction of installation time, and further reduction of installation cost can be expected.

Third Embodiment

Figure 5:
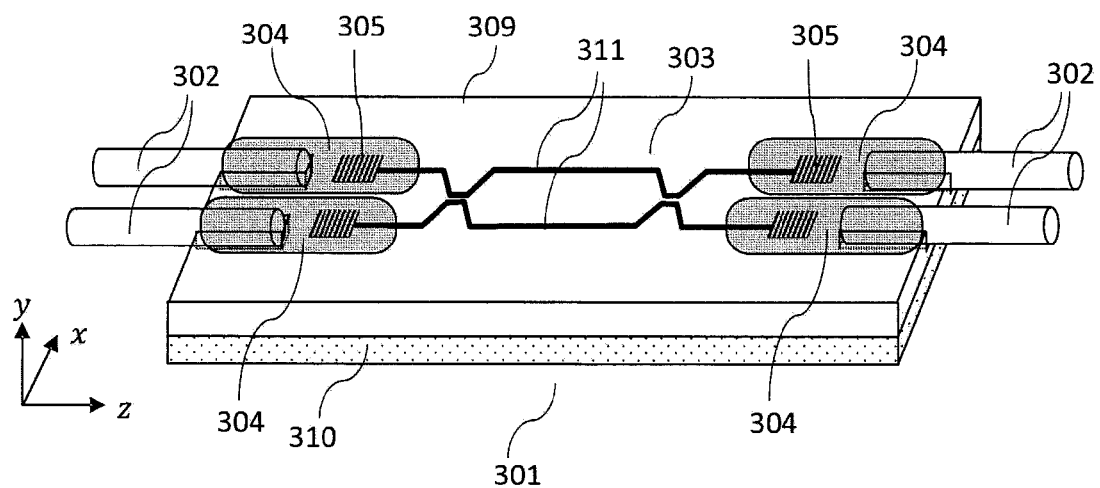
FIG. 5 is a schematic view illustrating an optical connection structure according to a third embodiment of the present invention.
Figure 6A:
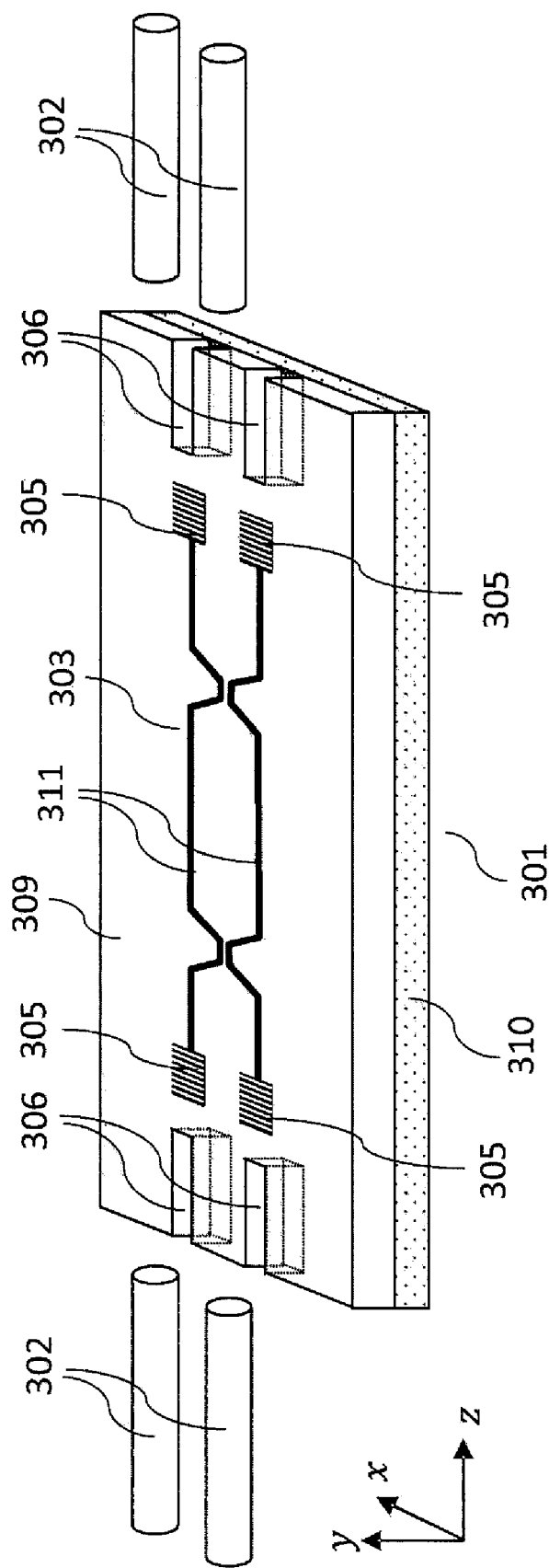
FIG. 6A is an exploded view of components of the optical connection structure before adhesion according to the third embodiment of the present invention.
Figure 6B:
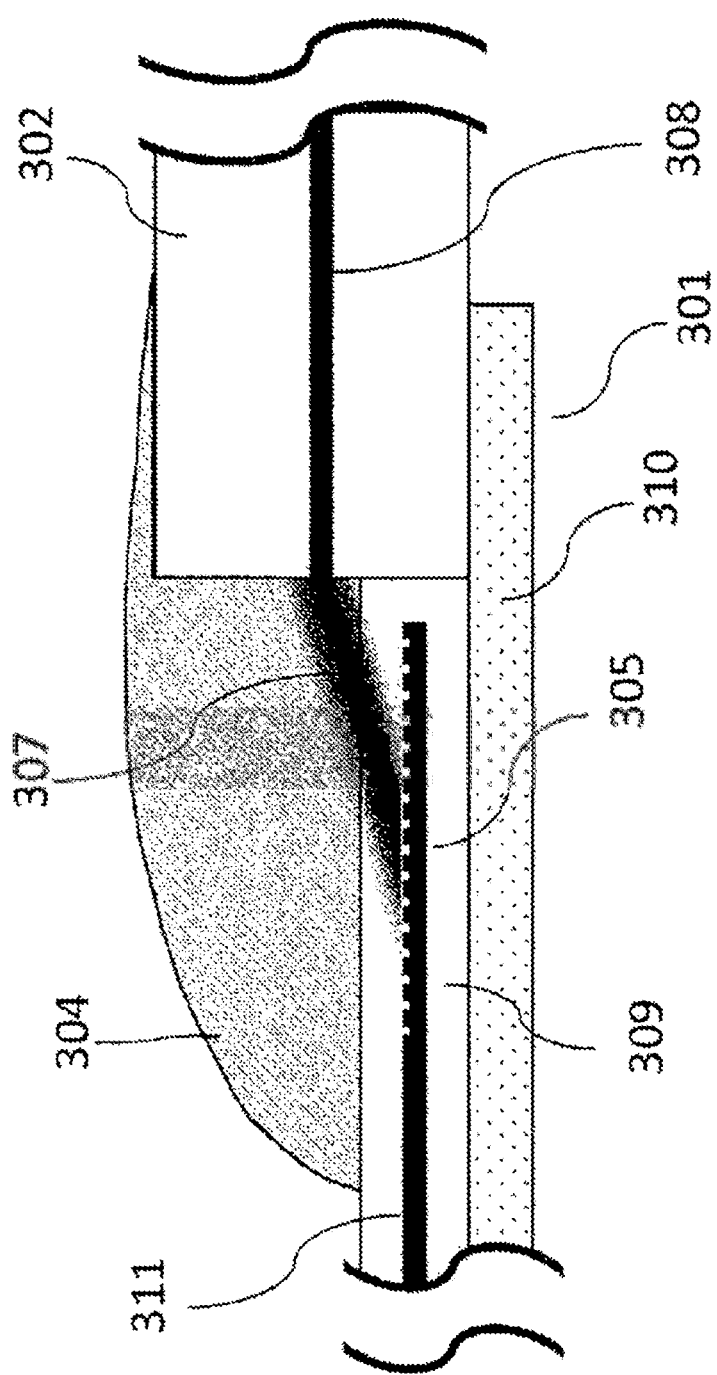
FIG. 6B is a sectional view of the optical connection structure before adhesion according to the third embodiment of the present invention.

Next, a third embodiment of the present invention will be described. FIGS. 5, 6A, and 6B are schematic diagrams illustrating an optical connection structure according to the third embodiment of the present invention. FIG. 5 is a perspective view of the optical connection structure, FIG. 6A is an exploded view of components of the optical connection structure before adhesion, and FIG. 6B is a sectional view of the optical connection structure cut along a yz plane.

Similarly to the first embodiment, a PLC 301 that is an optical waveguide chip has a structure in which an optical waveguide 303 and a grating coupler 305 are formed on a substrate 310. The optical waveguide 303 includes a cladding layer 309 and a core 311 formed in the cladding layer 309. Further, a grating coupler 305 is formed in the cladding layer 309, and the optical waveguide 303 and the grating coupler 305 are optically connected to each other. The adhering position of an optical fiber 302 is near the grating coupler 305 with an optical adhesive 304.

As is obvious from the exploded view of components before adhesion illustrated in FIG. 6A, the optical waveguide 303 and the grating coupler 305 are formed on the PLC 301. Further, a fitting groove 306 to be fitted to the optical fiber 302 is formed in the cladding layer 309 in the PLC 301 from a position in the vicinity of the grating coupler 305 to a position at which the fitting groove 306 reaches an end surface of the PLC 301 along an in-plane direction of the cladding layer 309. The fitting groove 306 is formed such that optimal optical coupling is achieved between the optical fiber 302 fitted into the fitting groove 306 and the grating coupler 305.

A difference from the first and second embodiments is that the fitting groove 306 is formed so as to penetrate through the entire cladding layer 309 and reach the cladding lower layer (the substrate 310 in the embodiment) below the cladding layer 309. A physical aligning structure required for passive alignment is realized by causing the optical fiber 302 to be fitted into the fitting groove 306. Although a method for manufacturing the fitting groove 306 is not particularly limited, it is possible to produce the fitting groove 306 with precision required for passive alignment even in a case in which photolithography that is a typical PLC producing method is employed.

FIG. 6B is a sectional view of a state in which the optical fiber 302 is fitted into the fitting groove 306 in the PLC 301. An optical fiber core 308 is formed in the optical fiber 302. As described above, the optical fiber 302 is caused to adhere to the PLC 301 with an optical adhesive 304 in a state in which the optical fiber 302 is fitted into the fitting groove 306. With the aforementioned structure, optical coupling between the PLC 301 and the optical fiber 302 is established by the light beam 307 being emitted from the optical fiber 302 and being incident on the optical waveguide 303 via the grating coupler 305, or by light from the optical waveguide 303 being emitted as the light beam 307 from the grating coupler 305 and being incident on the optical fiber 302.

In general, the diameter of the optical fiber core 308, the cladding diameter of the optical fiber 302, the thickness of the cladding layer 309 in the PLC 301, and the position of the optical waveguide 303 in the cladding layer 309 in a y-axis direction (thickness direction) cannot be freely selected for some commercial reasons or for convenience of manufacturing. However, using the structure according to the embodiment enables optical coupling between the optical waveguide 303 on the PLC 301 and the optical fiber core 308 of the optical fiber 302 by adjusting a coupling angle of the light beam 307 at the grating coupler 305 regardless of these physical dimensions.

Also, the PLC 301 and the optical fiber 302 can be aligned using the fitting groove 306 formed in the PLC 301. Although the method for manufacturing the grating coupler 305 and the fitting groove 306 is not particularly designated in the present invention, the grating coupler 305 and the fitting groove 306 can be produced with high precision using photolithography, electron beam lithography, or the like, and precision of a physical structure required to realize passive alignment can be secured.

Also, the fitting groove 306 is formed to penetrate through the cladding layer 309 up to a depth at which a cladding lower layer (the substrate 310 in the embodiment) is exposed, such that the upper surface of the cladding lower layer serves as a bottom surface of the fitting groove 306. The cladding layer 309 and the cladding lower layer are made of different materials. Thus, although the method for manufacturing the fitting groove 306 is not particularly designated in the present invention, it is possible to obtain significantly high precision in the depth direction of the fitting groove 306 using selective etching properties of the layer structure made of different materials in wet etching, for example.

Thus, according to the embodiment the optical connection between the PLC 301 and the optical fiber 302 can be implemented using only passive alignment without using active alignment similarly to the first embodiment, and it is possible to reduce an installation time and installation cost as compared with the case in which active alignment is used. Also, according to the embodiment, it is possible to enhance the precision of the optical connection in the y-axis direction (thickness direction) as compared with those in the first and second embodiments, by forming the fitting groove 306 up to the depth at which the cladding lower layer is exposed.

Fourth Embodiment

Figure 7:
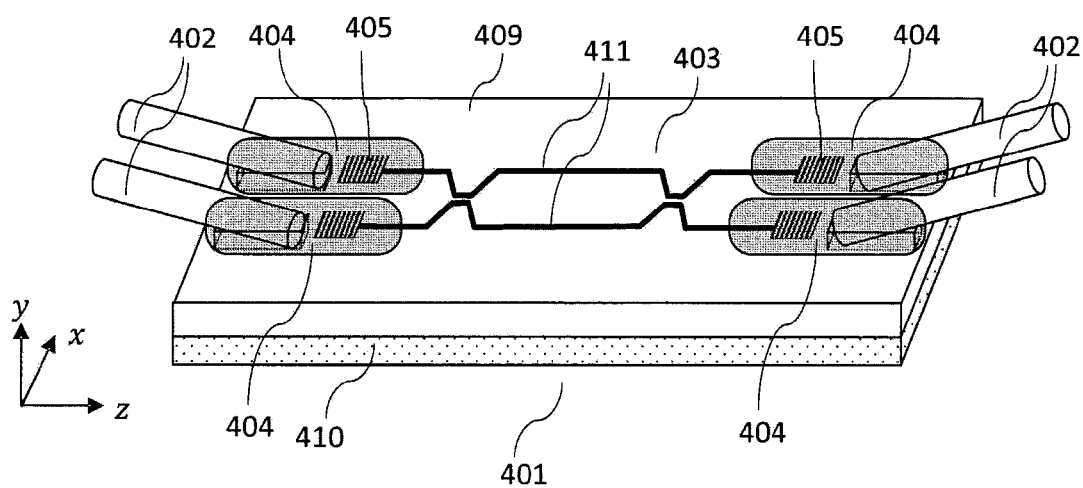
FIG. 7 is a schematic view illustrating an optical connection structure according to a fourth embodiment of the present invention.
Figure 8A:
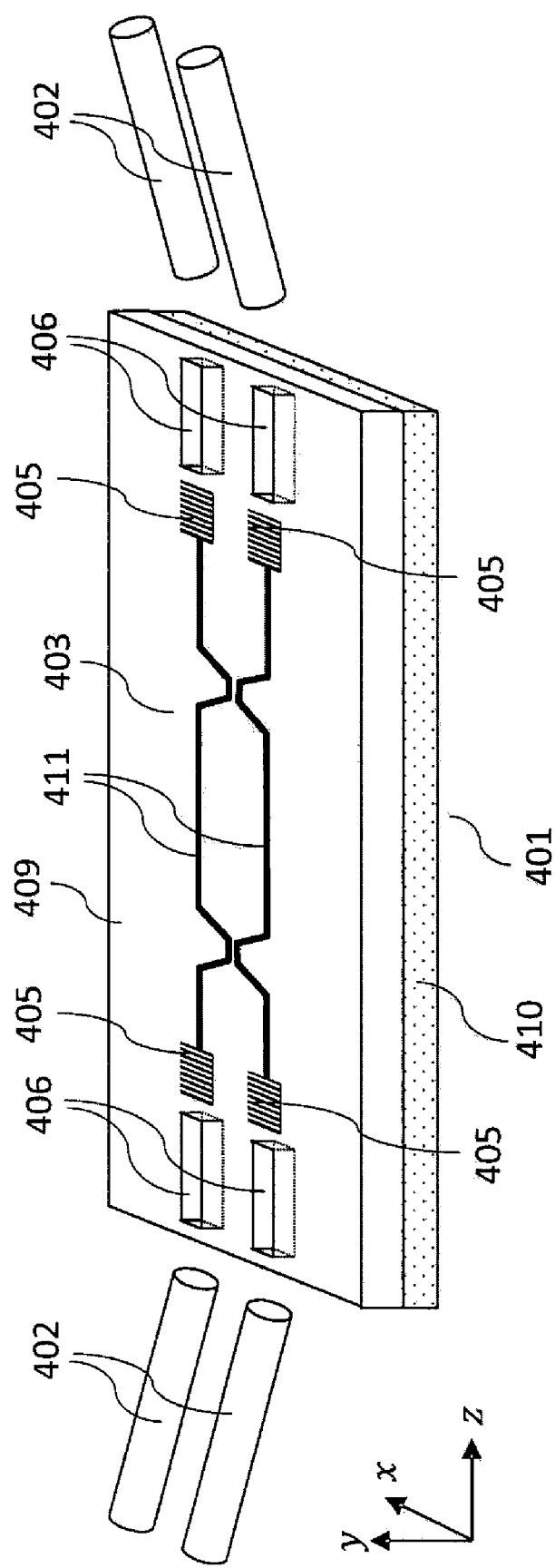
FIG. 8A is an exploded view of components of the optical connection structure before adhesion according to the fourth embodiment of the present invention.
Figure 8B:
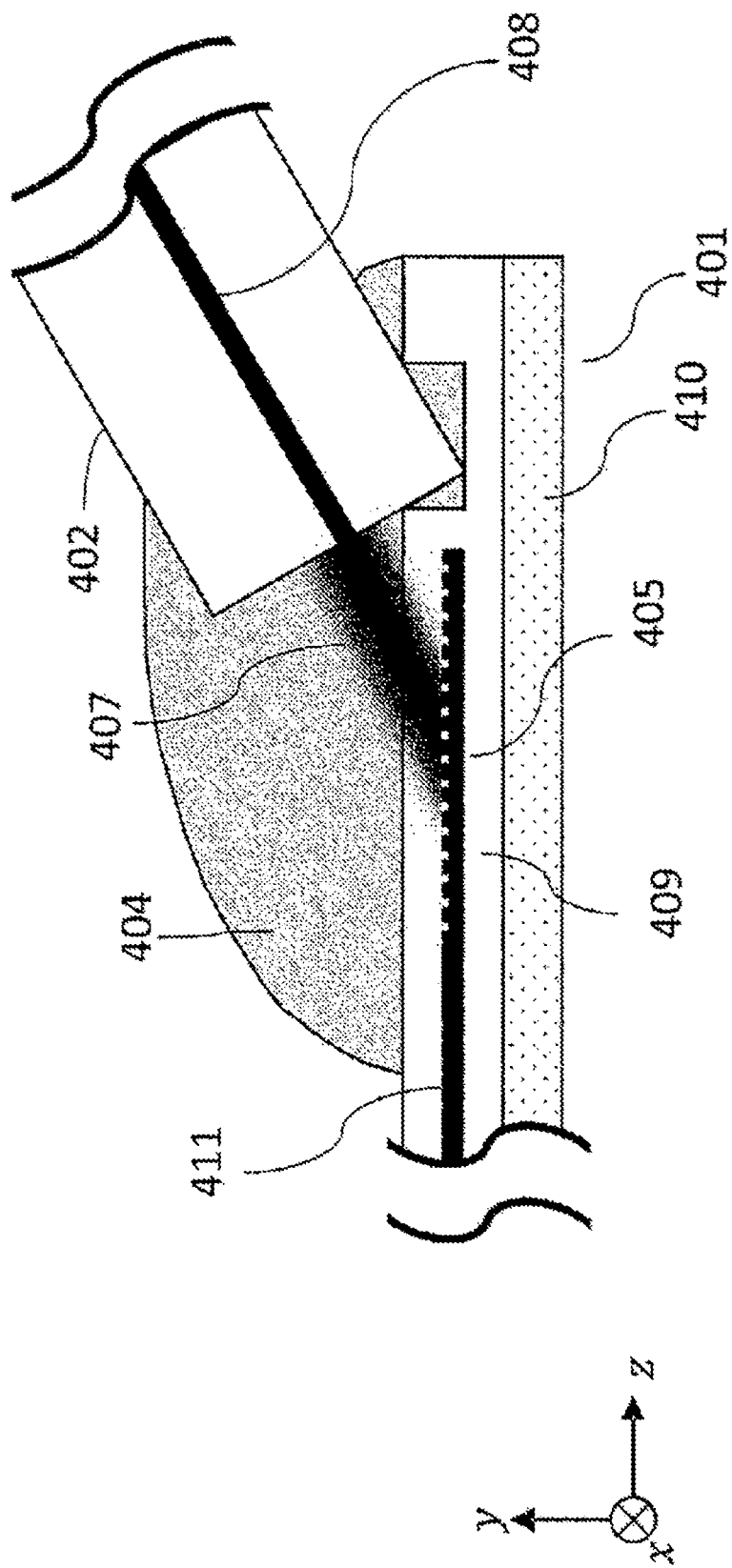
FIG. 8B is a sectional view of the optical connection structure before adhesion according to the fourth embodiment of the present invention.

Next, a fourth embodiment of the present invention will be described. FIGS. 7, 8A, and 8B are schematic diagrams illustrating an optical connection structure according to the fourth embodiment of the present invention. FIG. 7 is a perspective view of the optical connection structure, FIG. 8A is an exploded view of components of the optical connection structure before adhesion, and FIG. 8B is a sectional view of the optical connection structure cut along a yz plane.

Similarly to the first embodiment, a PLC 401 that is an optical waveguide chip has a structure in which an optical waveguide 403 and a grating coupler 405 are formed on a substrate 410. The optical waveguide 403 includes a cladding layer 409 and a core 411 formed in the cladding layer 409. Further, a grating coupler 405 is formed in the cladding layer 409, and the optical waveguide 403 and the grating coupler 405 are optically connected to each other. The adhering position of an optical fiber 402 is near the grating coupler 405 with an optical adhesive 404.

As is obvious from the exploded view of components before adhesion illustrated in FIG. 8A, the optical waveguide 403 and the grating coupler 405 are formed on the PLC 401. Further, the fitting groove 406 into which the optical fiber 402 is fitted is formed in the cladding layer 409 in the PLC 401 so as to extend from a position in the vicinity of the grating coupler 405 toward the end surface of the PLC 401 along the in-plane direction of the cladding layer 409 and end at a position at which the fitting groove 406 does not reach the end surface. The fitting groove 406 is formed such that optimal optical coupling is achieved between the optical fiber 402 fitted into the fitting groove 406 and the grating coupler 405.

A difference from the first to third embodiments is that the fitting groove 406 does not reach the end surface of the PLC 401. A physical aligning structure required for passive alignment is realized by causing the optical fiber 402 to be fitted into the fitting groove 406. Although a method for manufacturing the fitting groove 406 is not particularly limited, it is possible to produce the fitting groove 406 with precision required for passive alignment even in a case in which photolithography that is a typical PLC producing method is employed.

FIG. 8B is a sectional view of a state in which the optical fiber 402 is fitted into the fitting groove 406 in the PLC 401. An optical fiber core 408 is formed in the optical fiber 402. As described above, the optical fiber 402 is caused to adhere to the PLC 401 with an optical adhesive 404 in a state in which the optical fiber 402 is fitted into the fitting groove 406. With the aforementioned structure, optical coupling between the PLC 401 and the optical fiber 402 is established by the light beam 407 being emitted from the optical fiber 402 and being incident on the optical waveguide 403 via the grating coupler 405, or by light from the optical waveguide 403 being emitted as the light beam 407 from the grating coupler 405 and being incident on the optical fiber 402.

In general, the diameter of the optical fiber core 408, the cladding diameter of the optical fiber 402, the thickness of the cladding layer 409 in the PLC 401, and the position of the optical waveguide 403 in the cladding layer 409 in a y-axis direction (thickness direction) cannot be freely selected for some commercial reasons or for convenience of manufacturing. However, using the structure according to the embodiment enables optical coupling between the optical waveguide 403 on the PLC 401 and the optical fiber core 408 of the optical fiber 402 by adjusting a coupling angle of the light beam 407 at the grating coupler 405 regardless of these physical dimensions.

Also, the PLC 401 and the optical fiber 402 can be aligned using the fitting groove 406 formed in the PLC 401. Although the method for manufacturing the grating coupler 405 and the fitting groove 406 is not particularly designated in the present invention, the grating coupler 405 and the fitting groove 406 can be produced with high precision using photolithography, electron beam lithography, or the like, and precision of a physical structure required to realize passive alignment can be secured.

Also, according to the embodiment, it is possible to cause the optical fiber 402 to be fitted to the PLC 401 with an inclination by appropriately designing the physical shape of the fitting groove 406 from the position in the vicinity of the grating coupler 405 to the position at which the fitting groove 406 does not reach the end surface of the PLC 401. In the first to third examples, there is a problem in that an optical loss occurs due to angular deviations between the light beams 107, 207, and 307 and the optical fiber cores 108, 208, and 308 of the optical fibers 102, 202, and 302 in principle. On the other hand, according to the embodiment, it is possible to reduce the angular deviation between the light beam 407 and the optical fiber core 408 of the optical fiber 402 to zero.

Thus, according to the embodiment, the optical connection between the PLC 401 and the optical fiber 402 can be realized using only passive alignment without using active alignment similarly to the first embodiment, and it is possible to reduce an installation time and installation cost as compared with the case in which active alignment is used. Also, according to the embodiment, it is possible to reduce a loss due to optical connection as compared with those in the first to third embodiments, by the fitting groove 406 from the position in the vicinity of the grating coupler 405 to the position at which the fitting groove 406 does not reach the end surface of the PLC 401.

Fifth Embodiment

Figure 9:
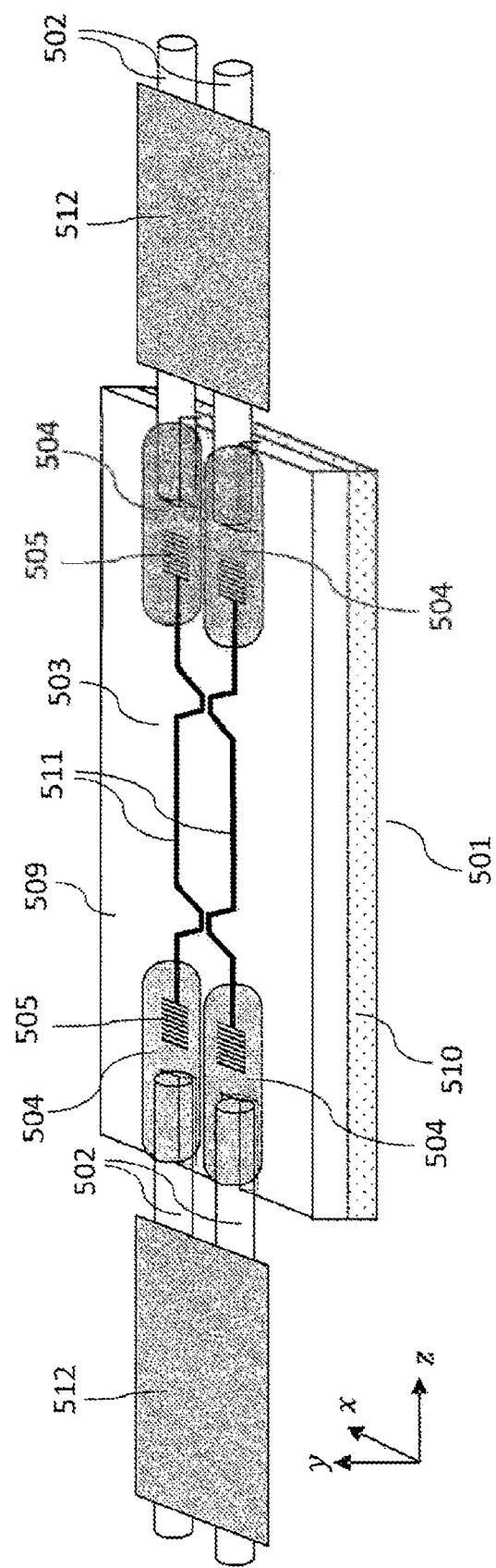
FIG. 9 is a schematic view illustrating an optical connection structure according to a fifth embodiment of the present invention.
Figure 10A:
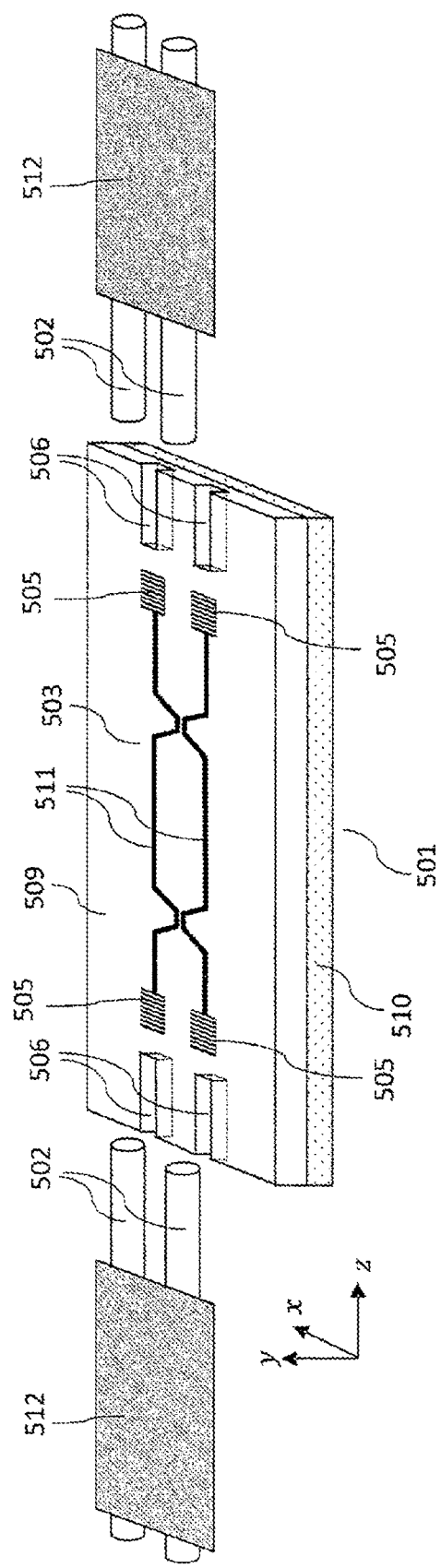
FIG. 10A is an exploded view of components of the optical connection structure before adhesion according to the fifth embodiment of the present invention.
Figure 10B:
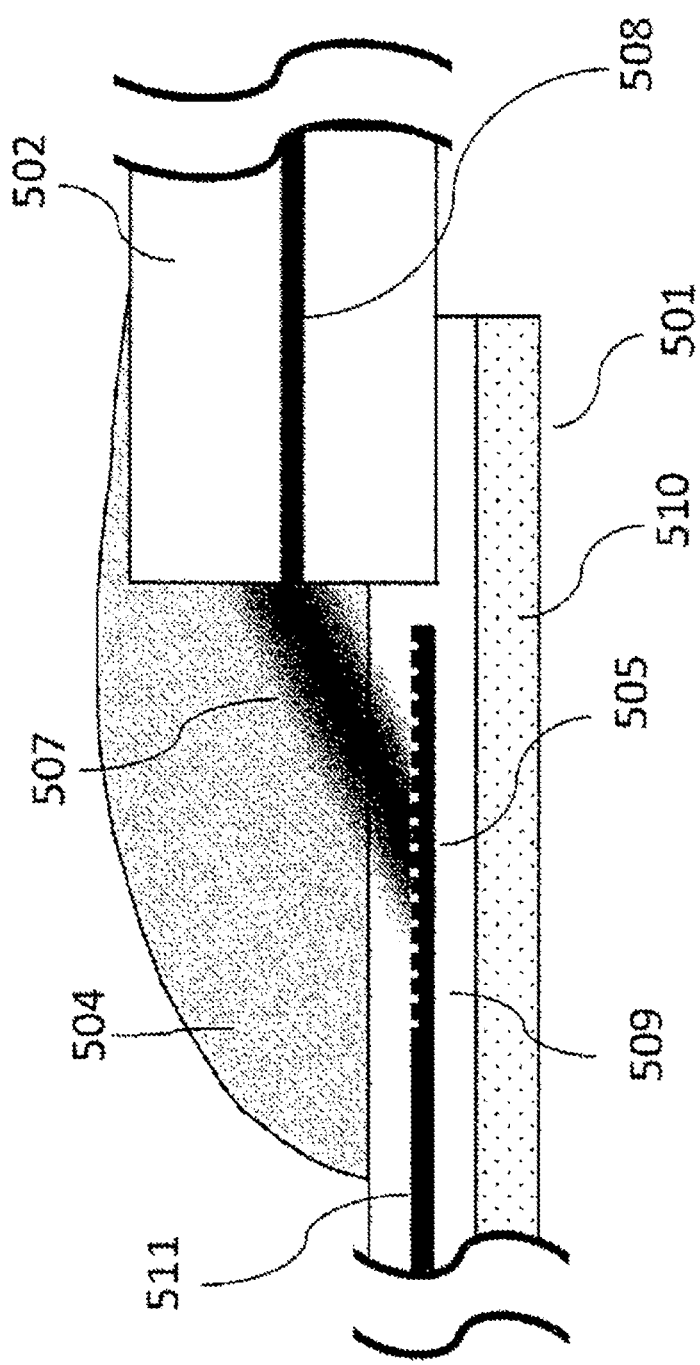
FIG. 10B is a sectional view of the optical connection structure before adhesion according to the fifth embodiment of the present invention.

Next, a fifth embodiment of the present invention will be described. FIGS. 9, 10A, and 10B are schematic diagrams illustrating an optical connection structure according to the fifth embodiment of the present invention. FIG. 9 is a perspective view of the optical connection structure, FIG. 10A is an exploded view of components of the optical connection structure before adhesion, and FIG. 10B is a sectional view of the optical connection structure cut along a yz plane.

Similarly to the first embodiment, a PLC 501 that is an optical waveguide chip has a structure in which an optical waveguide 503 and a grating coupler 505 are formed on a substrate 510. The optical waveguide 503 includes a cladding layer 509 and a core 511 formed in the cladding layer 509. Further, a grating coupler 505 is formed in the cladding layer 509, and the optical waveguide 503 and the grating coupler 505 are optically connected to each other. The adhering position of an optical fiber 502 is near the grating coupler 505 with an optical adhesive 504. The optical fiber 502 is a multiple-core fiber bundled with a multiple-core fiber coating 512.

As is obvious from the exploded view of components before adhesion illustrated in FIG. 10A, the optical waveguide 503 and the grating coupler 505 are formed on the PLC 501. Further, a fitting groove 506 to be fitted to the optical fiber 502 similarly to the first embodiment is formed in the cladding layer 509 in the PLC 501 from a position in the vicinity of the grating coupler 505 to a position at which the fitting groove 506 reaches an end surface of the PLC 501 along an in-plane direction of the cladding layer 509. The fitting groove 506 is formed such that optimal optical coupling is achieved between the optical fiber 502 fitted into the fitting groove 506 and the grating coupler 505. This realizes a physical aligning structure required for passive alignment. Although a method for manufacturing the fitting groove 506 is not particularly limited, it is possible to produce the fitting groove 506 with precision required for passive alignment even in a case in which photolithography that is a typical PLC producing method is employed.

FIG. 10B is a sectional view of a state in which the optical fiber 502 is fitted into the fitting groove 506 in the PLC 501. An optical fiber core 508 is formed in the optical fiber 502. As described above, the optical fiber 502 is caused to adhere to the PLC 501 with an optical adhesive 504 in a state in which the optical fiber 502 is fitted into the fitting groove 506. With the aforementioned structure, optical coupling between the PLC 501 and the optical fiber 502 is established by the light beam 507 being emitted from the optical fiber 502 and being incident on the optical waveguide 503 via the grating coupler 505, or by light from the optical waveguide 503 being emitted as the light beam 507 from the grating coupler 505 and being incident on the optical fiber 502.

In general, the diameter of the optical fiber core 508, the cladding diameter of the optical fiber 502, the thickness of the cladding layer 509 in the PLC 501, and the position of the optical waveguide 503 in the cladding layer 509 in a y-axis direction (thickness direction) cannot be freely selected for some commercial reasons or for convenience of manufacturing. However, using the structure according to the embodiment enables optical coupling between the optical waveguide 503 on the PLC 501 and the optical fiber core 508 of the optical fiber 502 by adjusting a coupling angle of the light beam 507 at the grating coupler 505 regardless of these physical dimensions.

Also, the PLC 501 and the optical fiber 502 can be aligned using the fitting groove 506 formed in the PLC 501. Although the method for manufacturing the grating coupler 505 and the fitting groove 506 is not particularly designated in the present invention, the grating coupler 505 and the fitting groove 506 can be produced with high precision using photolithography, electron beam lithography, or the like, and precision of a physical structure required to realize passive alignment can be secured.

Thus, according to the embodiment, the optical connection between the PLC 501 and the optical fiber 502 can be realized using only passive alignment without using active alignment similarly to the first embodiment, and it is possible to reduce an installation time and installation cost as compared with the case in which active alignment is used. Also, according to the embodiment, it is possible to reduce the number of working processes of passive alignment itself and to realize further reduction of an installation time and installation cost because the optical fiber 502 is bundled with the multiple-core fiber coating 512.

Sixth Embodiment

Figure 11:
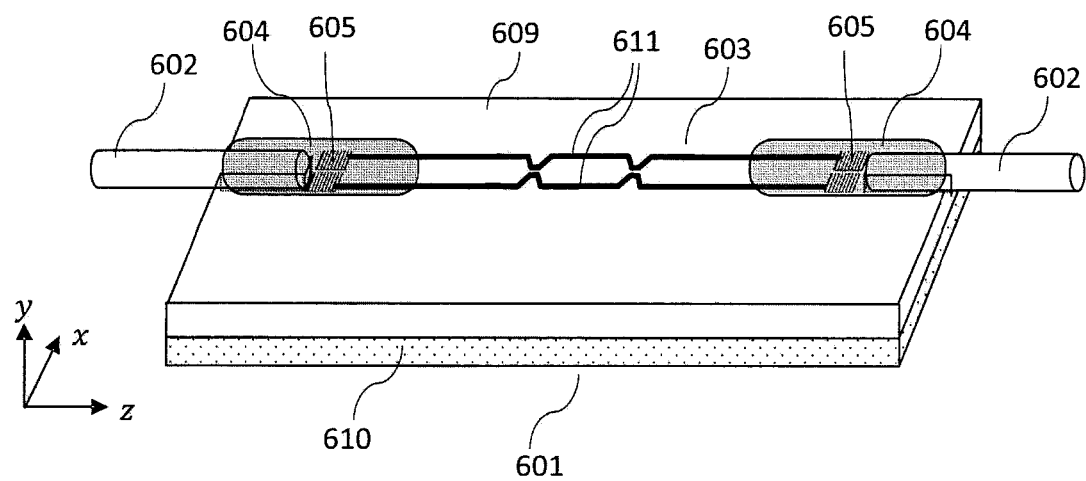
FIG. 11 is a sectional view illustrating an optical connection structure according to a sixth embodiment of the present invention.
Figure 12A:
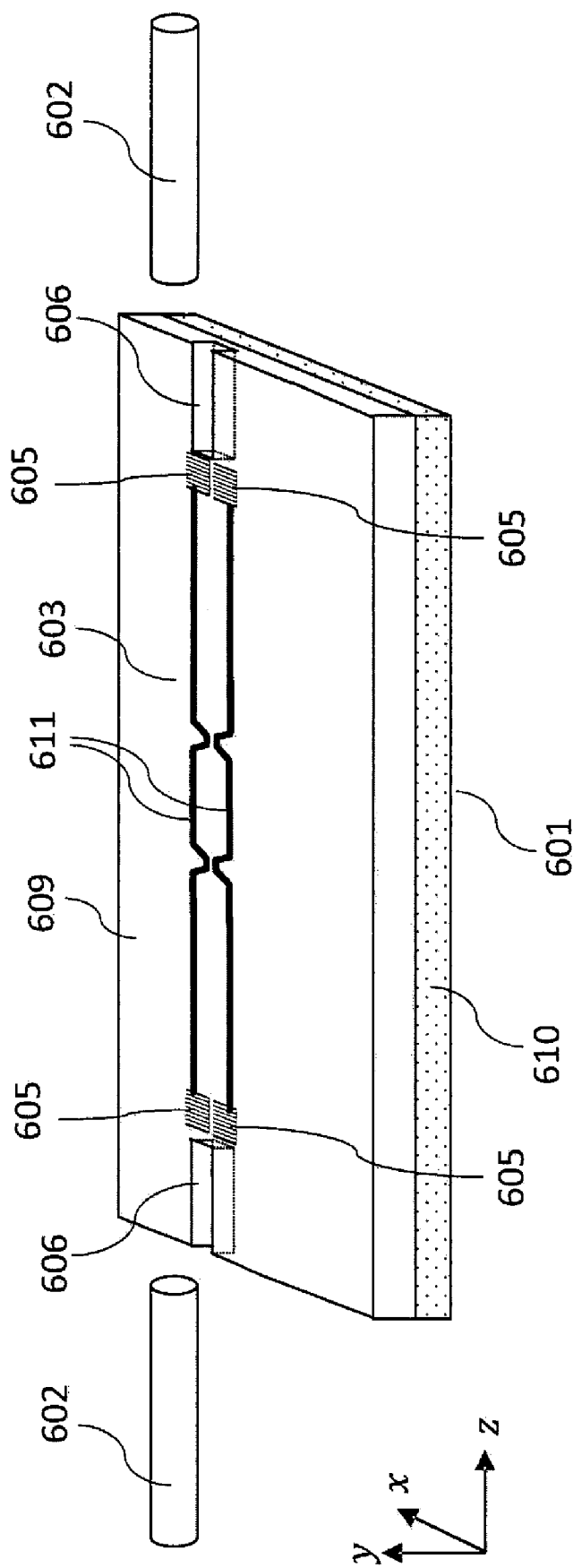
FIG. 12A is an exploded view of components of the optical connection structure before adhesion according to the sixth embodiment of the present invention.
Figure 12B:
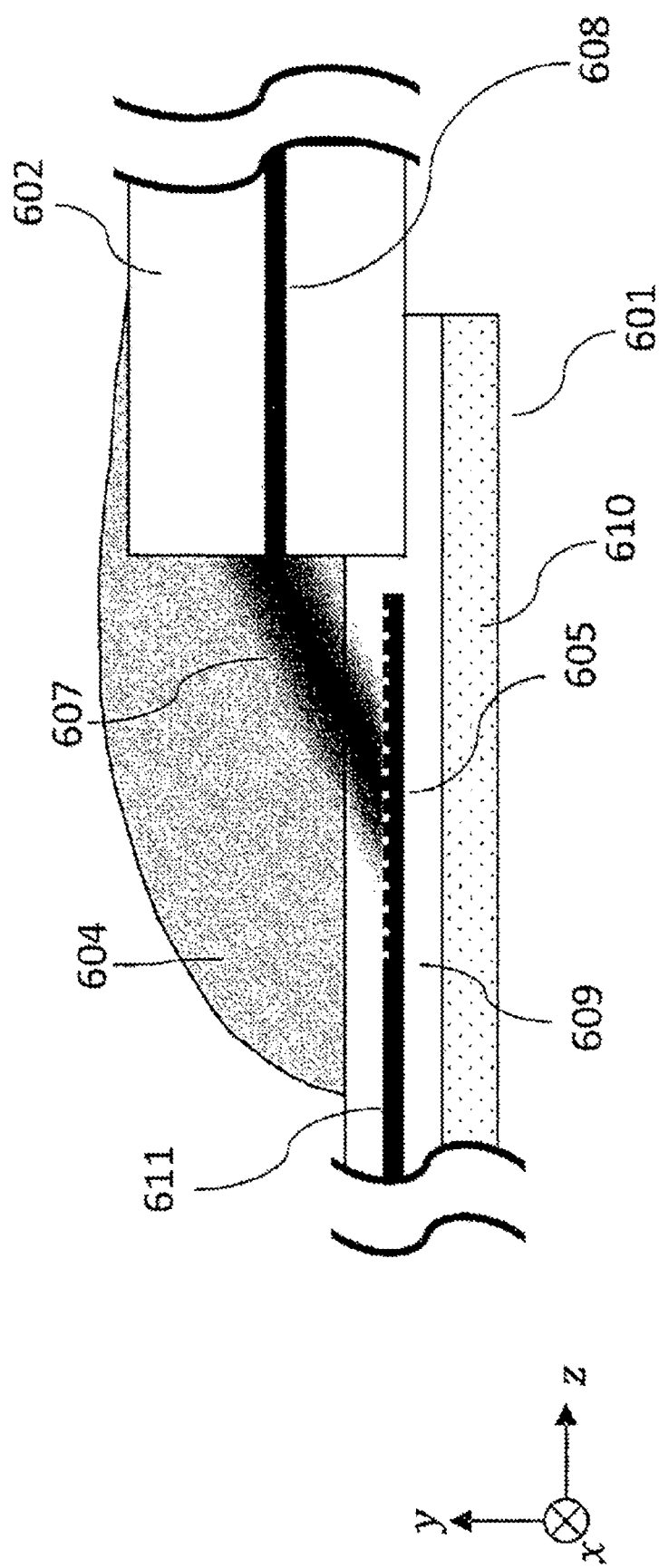
FIG. 12B is a sectional view of the optical connection structure before adhesion according to the sixth embodiment of the present invention.

Next, a sixth embodiment of the present invention will be described. FIGS. 11, 12A, and 12B are schematic diagrams illustrating an optical connection structure according to the sixth embodiment of the present invention. FIG. 11 is a perspective view of the optical connection structure, FIG. 12A is an exploded view of components of the optical connection structure before adhesion, and FIG. 12B is a sectional view of the optical connection structure cut along a yz plane.

Similarly to the first embodiment, a PLC 601 that is an optical waveguide chip has a structure in which an optical waveguide 603 and grating couplers 605 are formed on a substrate 610. The optical waveguide 603 includes a cladding layer 609 and a core 611 formed in the cladding layer 609. Further, grating couplers 605 are formed in the cladding layer 609, and the optical waveguide 603 and the grating couplers 605 are optically connected to each other. The adhering position of a multicore optical fiber 602 is near the grating couplers 605 with an optical adhesive 604.

As is obvious from the exploded view of components before adhesion illustrated in FIG. 12A, the optical waveguide 603 and the grating couplers 605 are formed on the PLC 601. Further, a fitting groove 606 is formed in the cladding layer 609 in the PLC 601 from a position in the vicinity of a plurality of grating couplers 605 (two grating couplers 605 in the embodiment) corresponding to each core of the multicore optical fiber 602 to a position at which the fitting groove 606 reaches an end surface of the PLC 601 along an in-plane direction of the cladding layer 609. The fitting groove 606 is formed such that optimal optical coupling is achieved between the multicore optical fiber 602 fitted into the fitting groove 606 and the grating couplers 605 in the x-axis direction and the y-axis direction. This realizes a physical aligning structure required for passive alignment. Although a method for manufacturing the fitting groove 606 is not particularly limited, it is possible to produce the fitting groove 606 with precision required for passive alignment even in a case in which photolithography that is a typical PLC producing method is employed.

FIG. 12B is a sectional view of a state in which the multicore optical fiber 602 is fitted into the fitting groove 606 in the PLC 601. A plurality of optical fiber cores 608 are formed in the multicore optical fiber 602. However, FIG. 12B illustrates only one optical fiber core 608. As described above, the multicore optical fiber 602 is caused to adhere to the PLC 601 with an optical adhesive 604 in a state in which the multicore optical fiber 602 is fitted into the fitting groove 606. With the aforementioned structure, optical coupling between the PLC 601 and the multicore optical fiber 602 is established by the light beams 607 being emitted from each of the plurality of optical fiber cores 608 of the multicore optical fiber 602 and being incident on the optical waveguide 603 via the plurality of corresponding grating couplers 605, or by a plurality of pieces of light from the optical waveguide 603 being emitted as the light beams 607 from the plurality of grating couplers 605 and being incident on the corresponding optical fiber cores 608 of the multicore optical fiber 602.

In general, the diameter of the optical fiber cores 608, the cladding diameter of the multicore optical fiber 602, the thickness of the cladding layer 609 in the PLC 601, and the position of the optical waveguide 603 in the cladding layer 609 in a y-axis direction (thickness direction) cannot be freely selected for some commercial reasons or for convenience of manufacturing. However, using the structure according to the embodiment enables optical coupling between the optical waveguide 603 on the PLC 601 and the optical fiber cores 608 of the multicore optical fiber 602 by adjusting a coupling angle of the light beams 607 at the grating couplers 605 regardless of these physical dimensions.

Also, the PLC 601 and the multicore optical fiber 602 can be aligned using the fitting groove 606 formed in the PLC 601. Although the method for manufacturing the grating couplers 605 and the fitting groove 606 is not particularly designated in the present invention, the grating couplers 605 and the fitting groove 606 can be produced with high precision using photolithography, electron beam lithography, or the like, and precision of a physical structure required to realize passive alignment can be secured.

However, because the multicore optical fiber 602 is used in the embodiment, besides the passive alignment, active alignment is required for aligning the multicore optical fiber 602 in the rotational direction about the axis after the fitting of the multicore optical fiber 602 into the fitting groove 606 is completed and adhesion of the multicore optical fiber 602 to the PLC 601 is required after the completion of the active alignment. According to the embodiment, because it is possible to realize the positioning of the multicore optical fiber 602 in the x-axis direction and the y-axis direction using passive alignment, it is possible to implement optical connection between the PLC 601 and the multicore optical fiber 602 using active alignment only for the positioning thereof in the rotational direction about the axis, thereby reducing an installation time and installation cost as compared with a case in which active alignment is used for all of the x-axis direction, the y-axis direction, and the rotational direction.

Seventh Embodiment

Figure 13:
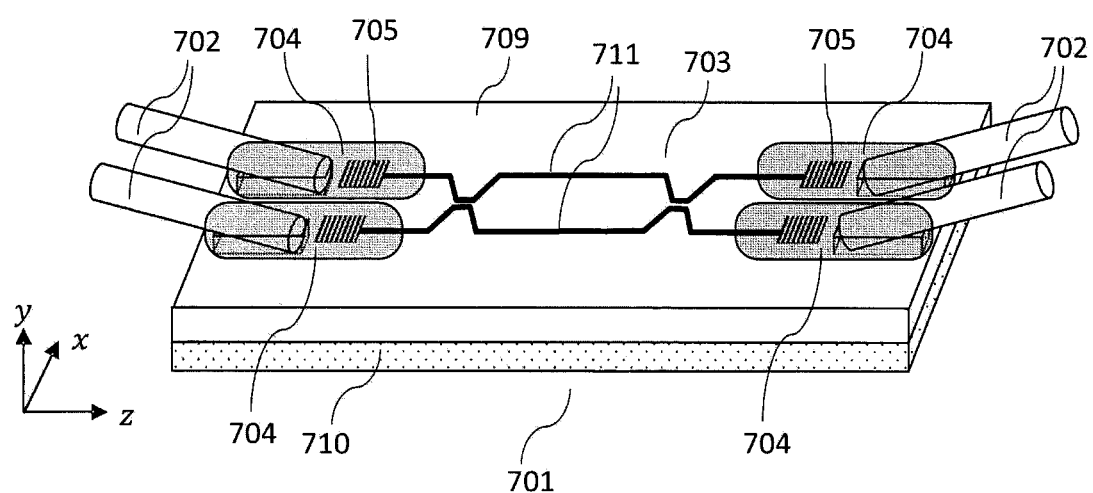
FIG. 13 is a schematic view illustrating an optical connection structure according to a seventh embodiment of the present invention.
Figure 14A:
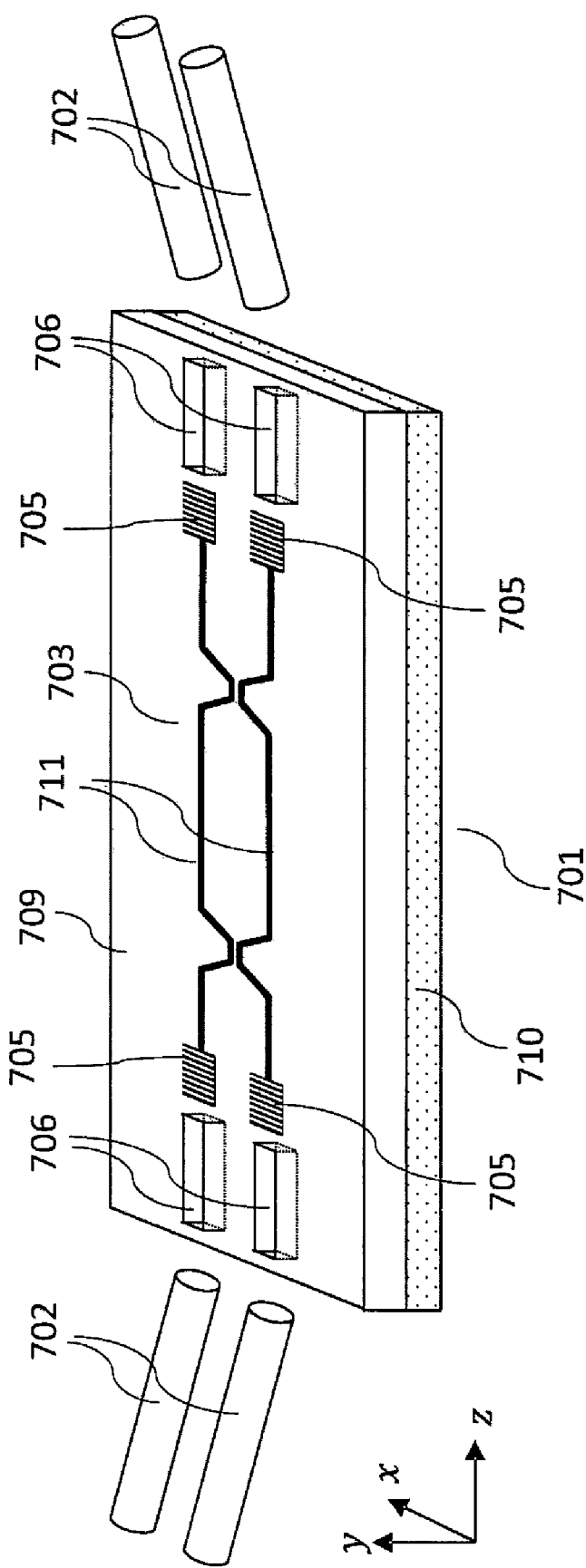
FIG. 14A is an exploded view of components of the optical connection structure before adhesion according to the seventh embodiment of the present invention.
Figure 14B:
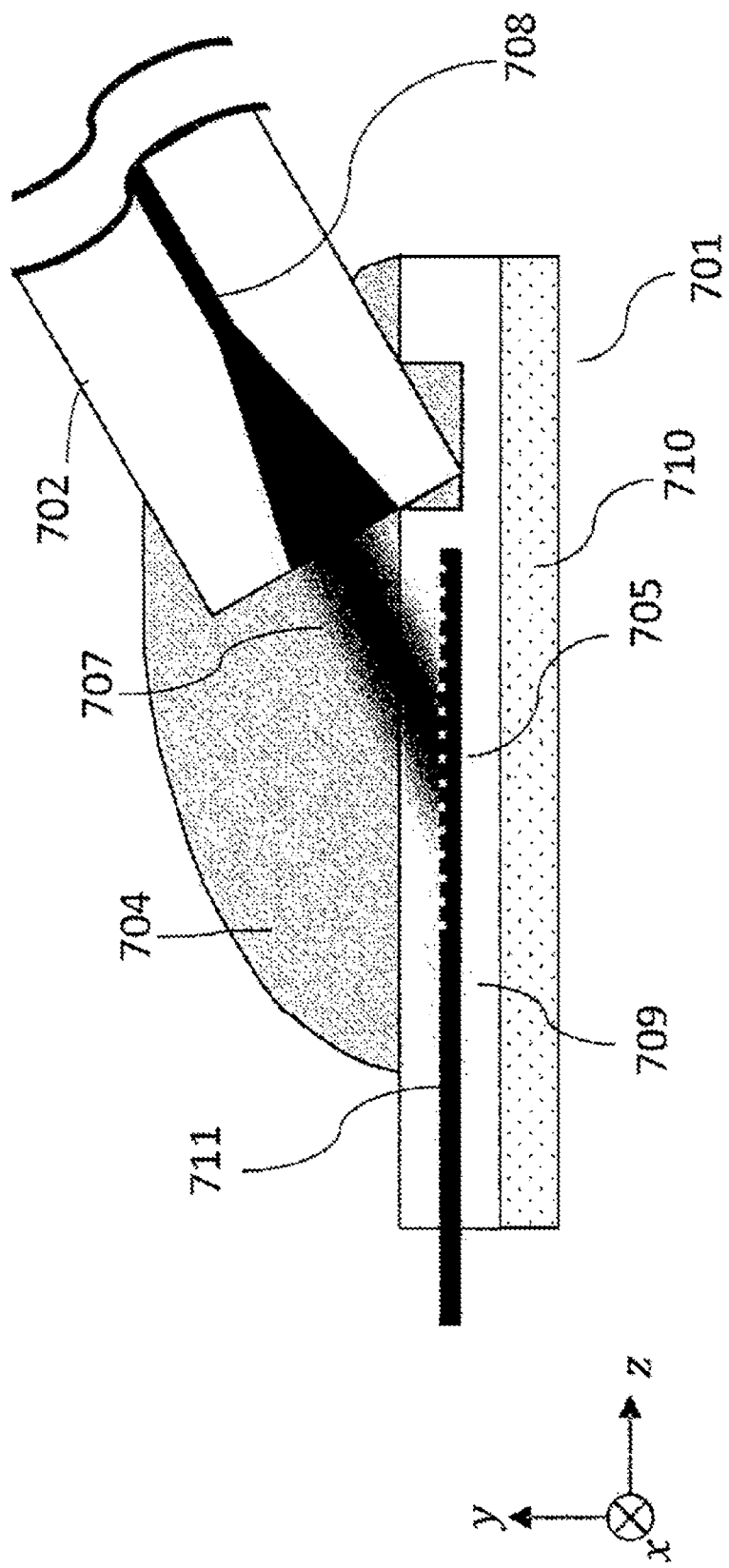
FIG. 14B is a sectional view of the optical connection structure before adhesion according to the seventh embodiment of the present invention.

Next, a seventh embodiment of the present invention will be described. FIGS. 13, 14A, and 14B are schematic diagrams illustrating an optical connection structure according to the seventh embodiment of the present invention. FIG. 13 is a perspective view of the optical connection structure, FIG. 14A is an exploded view of components of the optical connection structure before adhesion, and FIG. 14B is a sectional view of the optical connection structure cut along a yz plane.

Similarly to the first embodiment, a PLC 701 that is an optical waveguide chip has a structure in which an optical waveguide 703 and a grating coupler 705 are formed on a substrate 710. The optical waveguide 703 includes a cladding layer 709 and a core 711 formed in the cladding layer 709. Further, a grating coupler 705 is formed in the cladding layer 709, and the optical waveguide 703 and the grating coupler 705 are optically connected to each other. The adhering position of a thermally-expanded core (TEC) optical fiber 702 is near the grating coupler 705 with an optical adhesive 704.

As is obvious from the exploded view of components before adhesion illustrated in FIG. 14A, the optical waveguide 703 and the grating coupler 705 are formed on the PLC 701. Further, the fitting groove 706 to be fitted to the thermally-expanded core optical fiber 702 is formed in the cladding layer 709 in the PLC 701 so as to extend from the position in the vicinity of the grating coupler 705 toward the end surface of the PLC 701 along the in-plane direction of the cladding layer 709 and end at a position at which the fitting groove 706 does not reach the end surface. The fitting groove 706 is formed such that optimal optical coupling is achieved between the thermally-expanded core optical fiber 702 fitted into the fitting groove 706 and the grating coupler 705. This allows a physical aligning structure required for passive alignment to be implemented. Although a method for manufacturing the fitting groove 706 is not particularly limited, it is possible to produce the fitting groove 706 with precision required for passive alignment even in a case in which photolithography that is a typical PLC producing method is employed.

FIG. 14B is a sectional view of a state in which the thermally-expanded core optical fiber 702 is fitted into the fitting groove 706 in the PLC 701. An optical fiber core 708 is formed in the thermally-expanded core optical fiber 702. The thermally-expanded core optical fiber 702 is obtained by applying a heat to the distal end of a single-mode fiber to enlarge the diameter of the optical fiber core 708. As described above, the thermally-expanded core optical fiber 702 is caused to adhere to the PLC 701 with an optical adhesive 704 in a state in which the thermally-expanded core optical fiber 702 is fitted into the fitting groove 706. With the aforementioned structure, optical coupling between the PLC 701 and the thermally-expanded core optical fiber 702 is established by the light beam 707 being emitted from the thermally-expanded core optical fiber 702 and being incident on the optical waveguide 703 via the grating coupler 705, or by light from the optical waveguide 703 being emitted as the light beam 707 from the grating coupler 705 and being incident on the thermally-expanded core optical fiber 702.

In general, the diameter of the optical fiber core 708, the cladding diameter of the thermally-expanded core optical fiber 702, the thickness of the cladding layer 709 in the PLC 701, and the position of the optical waveguide 703 in the cladding layer 709 in a y-axis direction (thickness direction) cannot be freely selected for some commercial reasons or for convenience of manufacturing. However, using the structure according to the embodiment enables optical coupling between the optical waveguide 703 on the PLC 701 and the optical fiber core 708 of the thermally-expanded core optical fiber 702 by adjusting a coupling angle of the light beam 707 at the grating coupler 705 regardless of these physical dimensions.

Also, the PLC 701 and the thermally-expanded core optical fiber 702 can be aligned using the fitting groove 706 formed in the PLC 701. Although the method for manufacturing the grating coupler 705 and the fitting groove 706 is not particularly designated in the present invention, the grating coupler 705 and the fitting groove 706 can be produced with high precision using photolithography, electron beam lithography, or the like, and precision of a physical structure required to realize passive alignment can be secured.

Also, according to the embodiment, it is possible to cause the thermally-expanded core optical fiber 702 to be fitted to the PLC 701 with an inclination by appropriately designing the physical shape of the fitting groove 706 from the position in the vicinity of the grating coupler 705 to the position at which the fitting groove 706 does not reach the end surface of the PLC 701. With this configuration, according to the embodiment, it is possible to curb the angular deviation between the light beam 707 and the optical fiber core 708 of the thermally-expanded core optical fiber 702 to zero.

Thus, according to the embodiment, the optical connection between the PLC 701 and the thermally-expanded core optical fiber 702 can be implemented using only passive alignment without using active alignment similarly to the first embodiment, and it is possible to reduce an installation time and installation cost as compared with the case in which active alignment is used. Also, according to the embodiment, it is possible to reduce a loss due to optical connection as compared with those in the first to third embodiments, by the fitting groove 706 from the position in the vicinity of the grating coupler 705 to the position at which the fitting groove 706 does not reach the end surface of the PLC 701.

Incidentally, the thermally-expanded core optical fiber 702 has a larger mode field diameter (MFD) as compared with that before heat treatment while the thermally-expanded core optical fiber 702 has a smaller numerical aperture (NA) as compared with that before heat treatment. Thus, it is possible to reduce an optical loss according to this embodiment in a case that an optical loss due to MFD mismatch is expected while there is a margin for the NA. Although this embodiment has a configuration in which the thermally-expanded core optical fiber 702 and the fitting groove 706 are combined, this is simply because the combination is a combination with good compatibility for reducing an optical loss, and the thermally-expanded core optical fiber 702 and the fitting groove 706 can be independently used.

Eighth Embodiment

Figure 15:
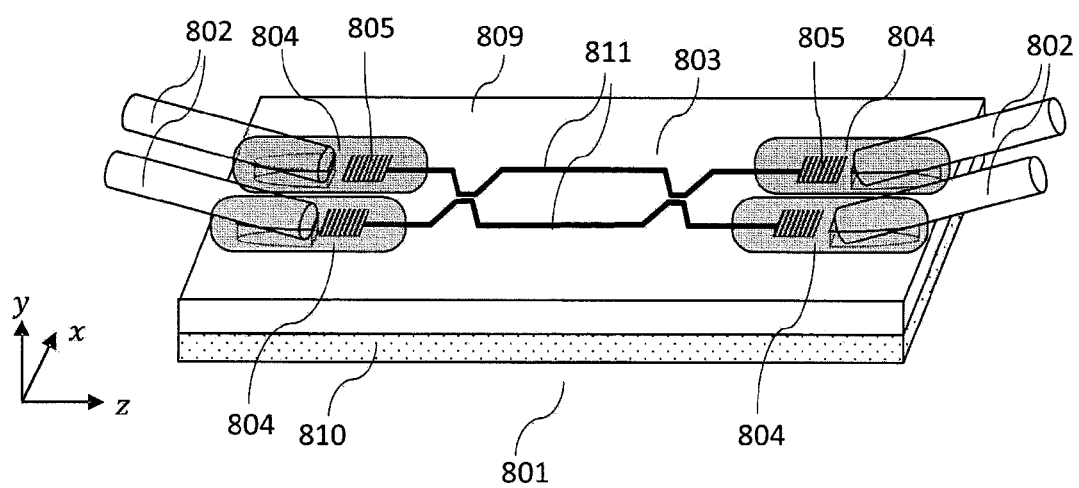
FIG. 15 is a schematic view illustrating an optical connection structure according to an eighth embodiment of the present invention.
Figure 16A:
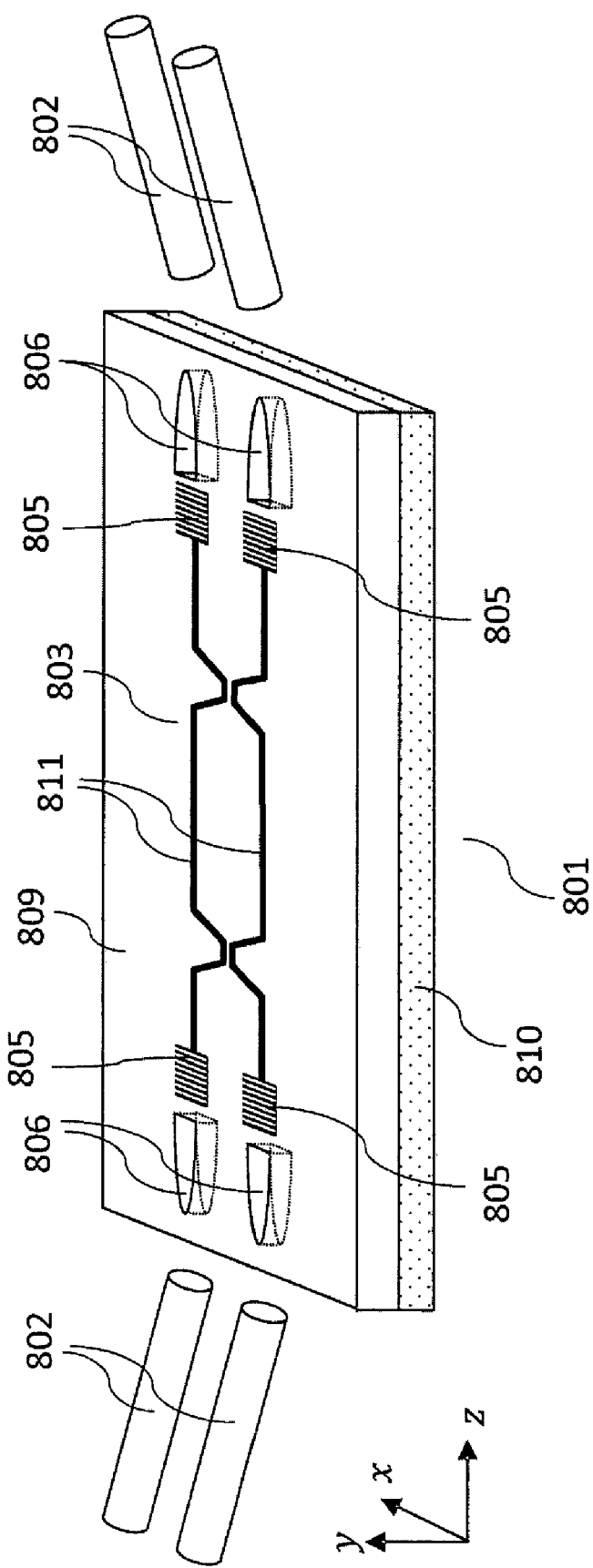
FIG. 16A is an exploded view of components of the optical connection structure before adhesion according to the eighth embodiment of the present invention.

Next, an eighth embodiment of the present invention will be described. FIGS. 15, 16A, and 1613 are schematic diagrams illustrating an optical connection structure according to the eighth embodiment of the present invention. FIG. 15 is a perspective view of the optical connection structure, FIG. 16A is an exploded view of components of the optical connection structure before adhesion, and FIG. 1613 is a sectional view of the optical connection structure cut along a yz plane.

Similarly to the first embodiment, a PLC 801 that is an optical waveguide chip has a structure in which an optical waveguide 803 and a grating coupler 805 are formed on a substrate 810. The optical waveguide 803 includes a cladding layer 809 and a core 811 formed in the cladding layer 809. Further, a grating coupler 805 is formed in the cladding layer 809, and the optical waveguide 803 and the grating coupler 805 are optically connected to each other. The adhering position of an optical fiber 802 is near the grating coupler 805 with an optical adhesive 804.

As is obvious from the exploded view of components before adhesion illustrated in FIG. 16A, the optical waveguide 803 and the grating coupler 805 are formed on the PLC 801. Further, the fitting groove 806 to be fitted to the optical fiber 802 is formed in the cladding layer 809 in the PLC 801 so as to extend from the position in the vicinity of the grating coupler 805 toward the end surface of the PLC 801 along the in-plane direction of the cladding layer 809 and end at a position before the fitting groove 806 reaches the end surface.

The fitting groove 806 is formed to have a planar shape in a top view, with a rectangular shape on the side close to the grating coupler 805 and an elliptical hemisphere shape on the side close to the end surface of the PLC 801 in which the rectangular shape and the elliptical hemispherical shape are combined such that the width of the rectangular shape (the width of the fitting groove 806) coincides with the shorter diameter of the elliptical hemisphere shape, such that optimal optical coupling is achieved between the optical fiber 802 fitted into the fitting groove 806 and the grating coupler 805. This allows a physical aligning structure required for passive alignment to be implemented. Although a method for manufacturing the fitting groove 806 is not particularly limited, it is possible to produce the fitting groove 806 with precision required for passive alignment even in a case in which photolithography that is a typical PLC producing method is employed.

Figure 16B:
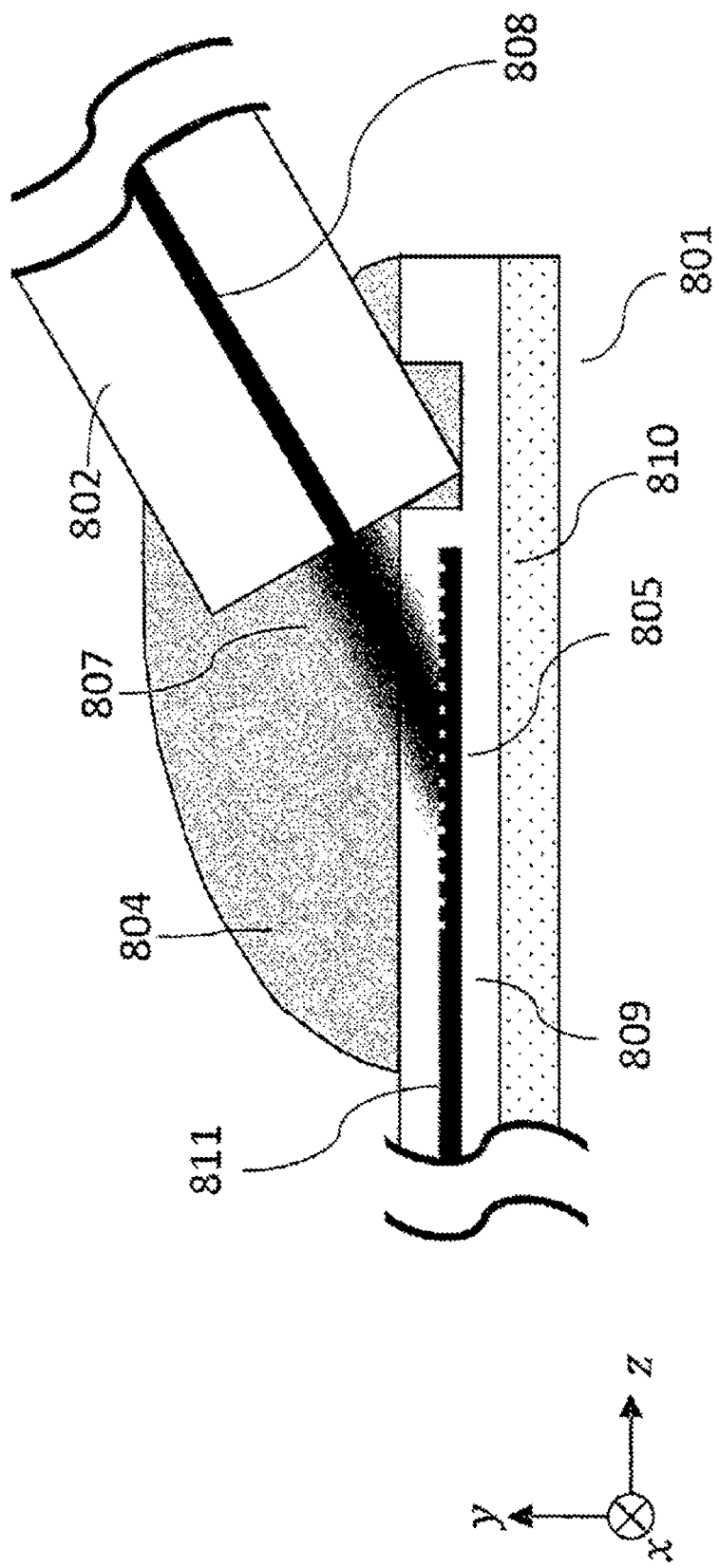
FIG. 16B is a sectional view of the optical connection structure before adhesion according to the eighth embodiment of the present invention.

FIG. 16B is a sectional view of a state in which the optical fiber 802 is fitted into the fitting groove 806 in the PLC 801. An optical fiber core 808 is formed in the optical fiber 802. As described above, the optical fiber 802 is caused to adhere to the PLC 801 with an optical adhesive 804 in a state in which the optical fiber 802 is fitted into the fitting groove 806. With the aforementioned structure, optical coupling between the PLC 801 and the optical fiber 802 is established by the light beam 807 being emitted from the optical fiber 802 and being incident on the optical waveguide 803 via the grating coupler 805, or by light from the optical waveguide 803 being emitted as the light beam 807 from the grating coupler 805 and being incident on the optical fiber 802.

In general, the diameter of the optical fiber core 808, the cladding diameter of the optical fiber 802, the thickness of the cladding layer 809 in the PLC 801, and the position of the optical waveguide 803 in the cladding layer 809 in a y-axis direction (thickness direction) cannot be freely selected for some commercial reasons or for convenience of manufacturing. However, using the structure according to the embodiment enables optical coupling between the optical waveguide 803 on the PLC 801 and the optical fiber core 808 of the optical fiber 802 by adjusting a coupling angle of the light beam 807 at the grating coupler 805 regardless of these physical dimensions.

Also, the PLC 801 and the optical fiber 802 can be aligned using the fitting groove 806 formed in the PLC 801. Although the method for manufacturing the grating coupler 805 and the fitting groove 806 is not particularly designated in the present invention, the grating coupler 805 and the fitting groove 806 can be produced with high precision using photolithography, electron beam lithography, or the like, and precision of a physical structure required to realize passive alignment can be secured.

Also, according to the embodiment, it is possible to cause the optical fiber 802 to be fitted to the PLC 801 with an inclination by appropriately designing the physical shape of the fitting groove 806 from the position in the vicinity of the grating coupler 805 to the position at which the fitting groove 806 does not reach the end surface of the PLC 801. With this structure, according to the embodiment, it is possible to curb the angular deviation between the light beam 807 and the optical fiber core 808 of the optical fiber 802 to zero.

Thus, according to the embodiment, the optical connection between the PLC 801 and the optical fiber 802 can be implemented using only passive alignment without using active alignment similarly to the first embodiment, and it is possible to reduce an installation time and installation cost as compared with the case in which active alignment is used. Also, according to the embodiment, it is possible to reduce a loss due to optical connection as compared with those in the first to third embodiments, by the fitting groove 806 from the position in the vicinity of the grating coupler 805 to the position at which the fitting groove 806 does not reach the end surface of the PLC 801. Further, according to the embodiment, it is possible to implement more stable passive alignment as that in the fourth embodiment by appropriately designing the shape of the elliptical hemisphere portion of the fitting groove 806 in accordance with the angle formed between the PLC 801 and the optical fiber 802.

Ninth Embodiment

Figure 17:
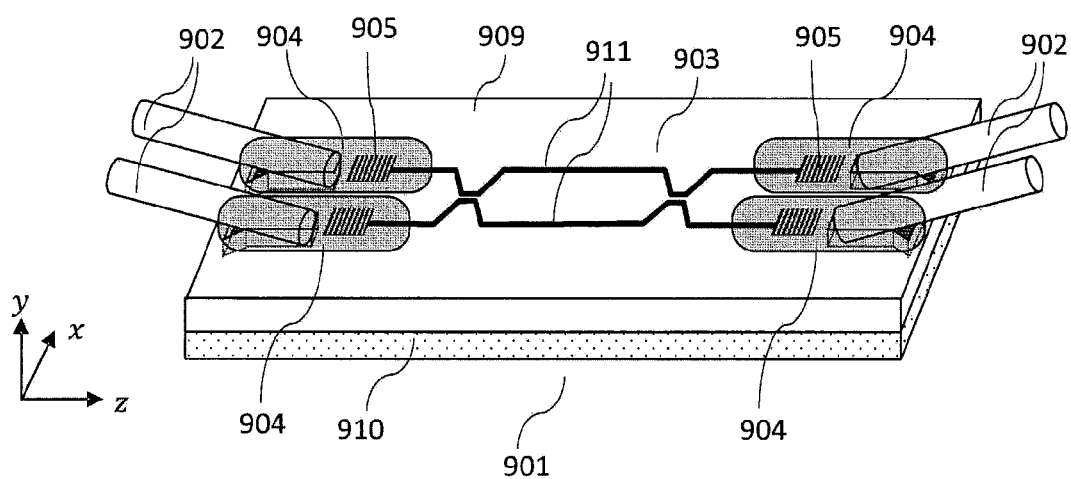
FIG. 17 is a schematic view illustrating an optical connection structure according to a ninth embodiment of the present invention.
Figure 18A:
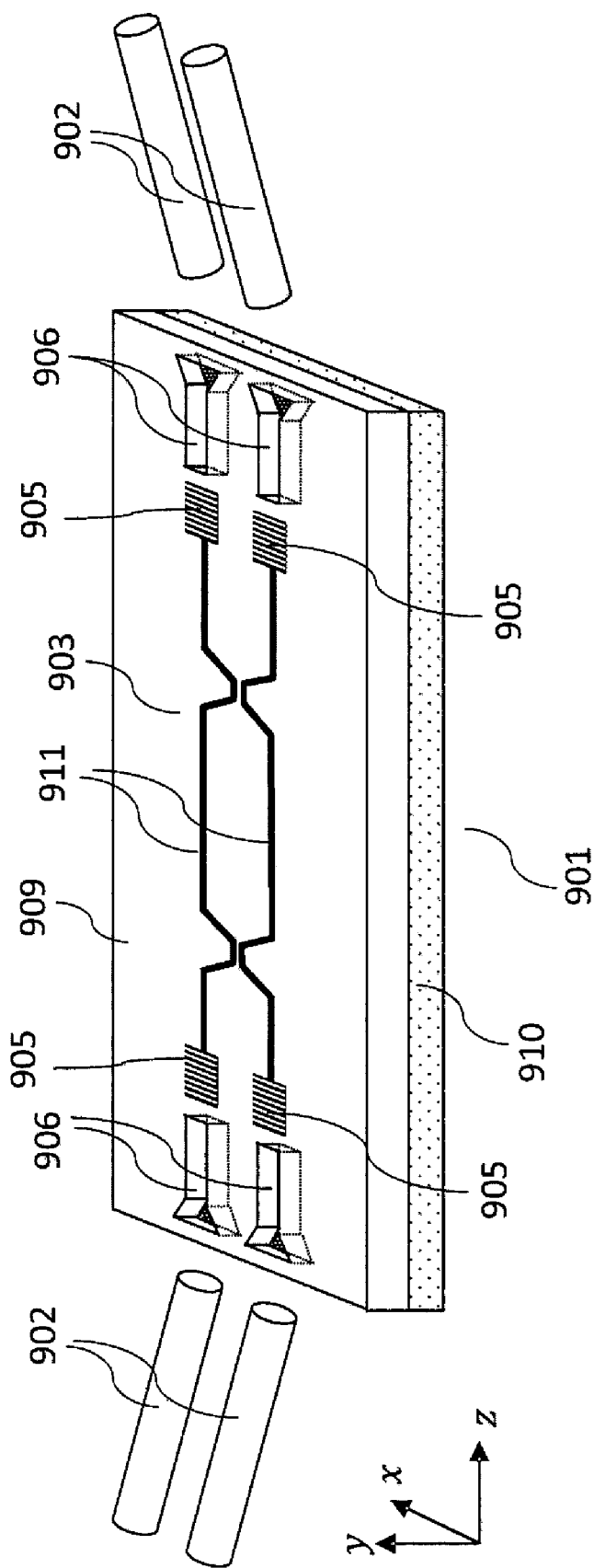
FIG. 18A is an exploded view of components of the optical connection structure before adhesion according to the ninth embodiment of the present invention.
Figure 18B:
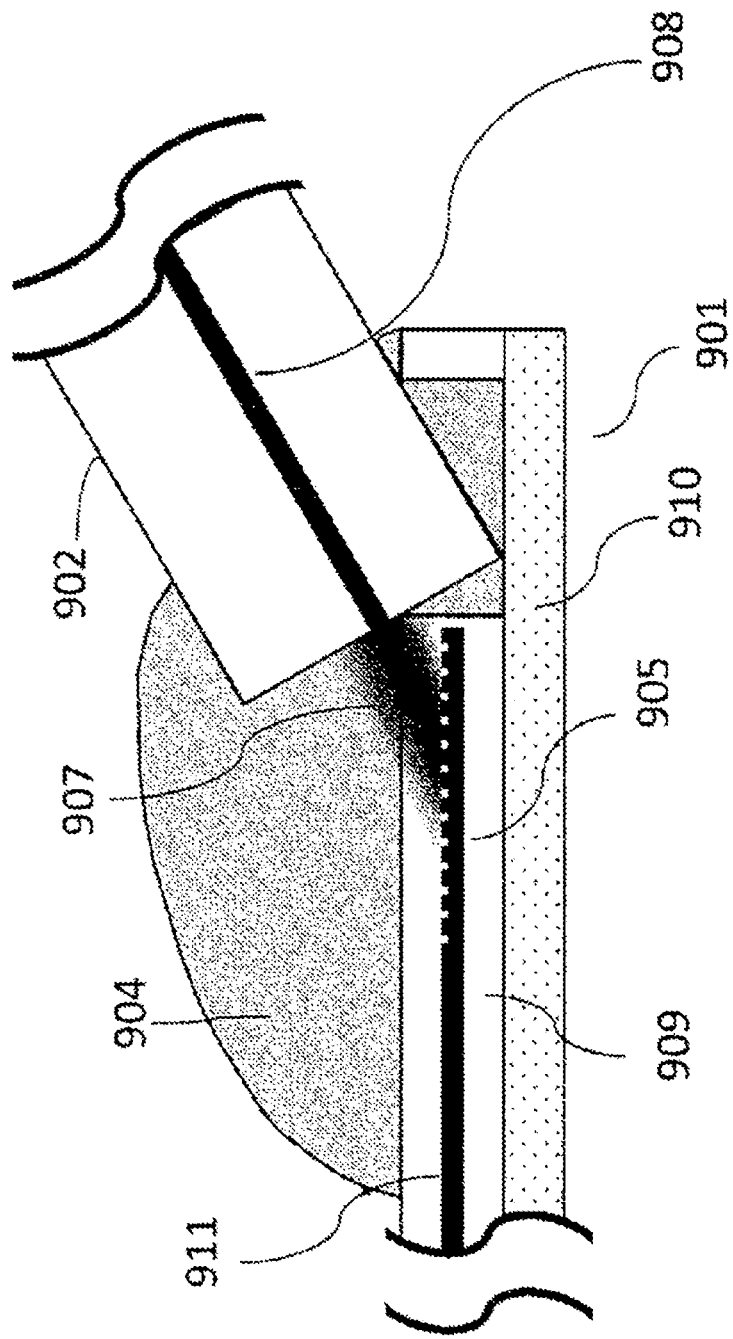
FIG. 18B is a sectional view of the optical connection structure before adhesion according to the ninth embodiment of the present invention.

Next, a ninth embodiment of the present invention will be described. FIGS. 17, 18A, and 18B are schematic diagrams illustrating an optical connection structure according to the ninth embodiment of the present invention. FIG. 17 is a perspective view of the optical connection structure, FIG. 18A is an exploded view of components of the optical connection structure before adhesion, and FIG. 18B is a sectional view of the optical connection structure cut along a yz plane.

Similarly to the first embodiment, a PLC 901 that is an optical waveguide chip has a structure in which an optical waveguide 903 and a grating coupler 905 are formed on a substrate 910. The optical waveguide 903 includes a cladding layer 909 and a core 911 formed in the cladding layer 909. Further, a grating coupler 905 is formed in the cladding layer 909, and the optical waveguide 903 and the grating coupler 905 are optically connected to each other. The adhering position of an optical fiber 902 is near the grating coupler 905 with an optical adhesive 904.

As is obvious from the exploded view of components before adhesion illustrated in FIG. 18A, the optical waveguide 903 and the grating coupler 905 are formed on the PLC 901. Further, the fitting groove 906 to be fitted to the optical fiber 902 similarly to the fourth embodiment is formed in the cladding layer 909 in the PLC 901 so as to extend from the position in the vicinity of the grating coupler 905 toward the end surface of the PLC 901 along the in-plane direction of the cladding layer 909 and end at a position at which the fitting groove 906 does not reach the end surface. The fitting groove 906 is formed such that optimal optical coupling is achieved between the optical fiber 902 fitted into the fitting groove 906 and the grating coupler 905.

Differences from the fourth embodiment are that the fitting groove 906 has a tapered guiding structure with a width gradually increasing toward the end surface of the PLC 901 in the vicinity of the end surface and that the fitting groove 906 is formed in the form of digging the entire cladding layer 909 to reach the cladding lower layer (the substrate 910 in the embodiment) below the cladding layer 909. A physical aligning structure required for passive alignment is implemented by causing the optical fiber 902 to be fitted into the fitting groove 906. Although a method for manufacturing the fitting groove 906 is not particularly limited, it is possible to produce the fitting groove 906 with precision required for passive alignment even in a case in which photolithography that is a typical PLC producing method is employed.

FIG. 18B is a sectional view of a state in which the optical fiber 902 is fitted into the fitting groove 906 in the PLC 901. An optical fiber core 908 is formed in the optical fiber 902. As described above, the optical fiber 902 is caused to adhere to the PLC 901 with an optical adhesive 904 in a state in which the optical fiber 902 is fitted into the fitting groove 906. With the aforementioned structure, optical coupling between the PLC 901 and the optical fiber 902 is established by the light beam 907 being emitted from the optical fiber 902 and being incident on the optical waveguide 903 via the grating coupler 905, or by light from the optical waveguide 903 being emitted as the light beam 907 from the grating coupler 905 and being incident on the optical fiber 902.

In general, the diameter of the optical fiber core 908, the cladding diameter of the optical fiber 902, the thickness of the cladding layer 909 in the PLC 901, and the position of the optical waveguide 903 in the cladding layer 909 in a y-axis direction (thickness direction) cannot be freely selected for some commercial reasons or for convenience of manufacturing. However, using the structure according to the embodiment enables optical coupling between the optical waveguide 903 on the PLC 901 and the optical fiber core 908 of the optical fiber 902 by adjusting a coupling angle of the light beam 907 at the grating coupler 905 regardless of these physical dimensions.

Also, the PLC 901 and the optical fiber 902 can be aligned using the fitting groove 906 formed in the PLC 901. Although the method for manufacturing the grating coupler 905 and the fitting groove 906 is not particularly designated in the present invention, the grating coupler 905 and the fitting groove 906 can be produced with high precision using photolithography, electron beam lithography, or the like, and precision of a physical structure required to realize passive alignment can be secured.

Also, according to the embodiment, it is possible to cause the optical fiber 902 to be fitted to the PLC 901 with an inclination by appropriately designing the physical shape of the fitting groove 906 from the position in the vicinity of the grating coupler 905 to the position at which the fitting groove 906 does not reach the end surface of the PLC 901. Thus, according to the embodiment, it is possible to curb the angular deviation between the light beam 907 and the optical fiber core 908 of the optical fiber 902 to zero.

Also, the fitting groove 906 is formed to penetrate through the cladding layer 909 up to a depth at which a cladding lower layer (the substrate 910 in the embodiment) is exposed, such that the upper surface of the cladding lower layer serves as a bottom surface of the fitting groove 906. The cladding layer 909 and the cladding lower layer are made of different materials. Thus, although the method for manufacturing the fitting groove 906 is not particularly designated in the present invention, it is possible to obtain significantly high precision in the depth direction of the fitting groove 906 using selective etching properties of the layer structure made of different materials in wet etching, for example.

Thus, according to the embodiment, the optical connection between the PLC 901 and the optical fiber 902 can be implemented using only passive alignment without using active alignment similarly to the first embodiment, and it is possible to reduce an installation time and installation cost as compared with the case in which active alignment is used.

Also, according to the embodiment, it is possible to reduce a loss due to optical connection as compared with those in the first to third embodiments, by the fitting groove 906 from the position in the vicinity of the grating coupler 905 to the position at which the fitting groove 906 does not reach the end surface of the PLC 901.

Also, according to this embodiment, it is possible to enhance error tolerance of passive alignment itself and to expect an improvement of yield, further reduction of an installation time, and further reduction of installation cost, using the fitting groove 906 provided with a guiding structure. Further, according to the embodiment, it is possible to enhance the precision of the optical connection in the y-axis direction (thickness direction) as compared with that in the first embodiment, by forming the fitting groove 906 up to the depth at which the cladding lower layer is exposed. This embodiment is an example of a combination of the second embodiment, the third embodiment, and the fourth embodiment, the present invention is not limited to this embodiment, and the embodiments of the present invention can be appropriately combined.

Tenth Embodiment

Figure 19:
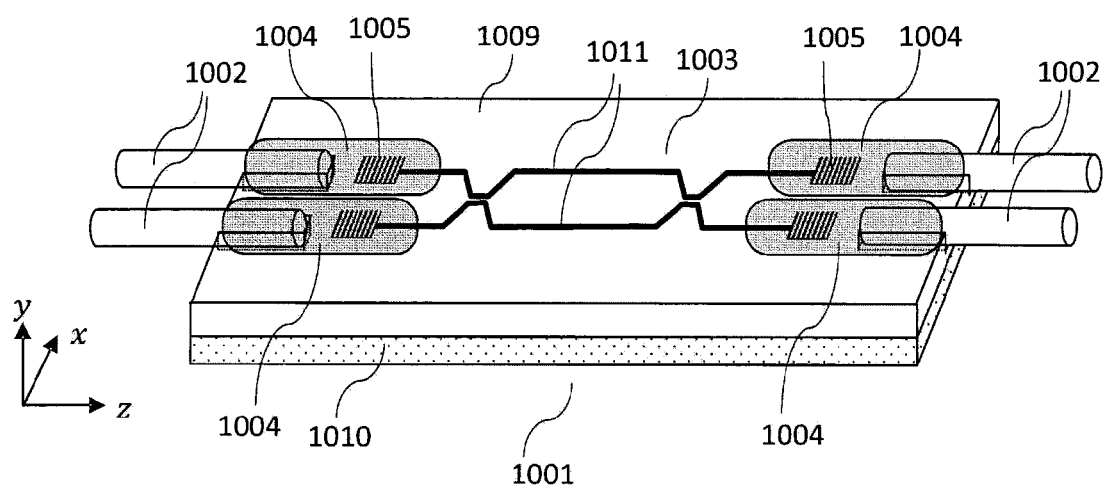
FIG. 19 is a schematic view illustrating an optical connection structure according to a tenth embodiment of the present invention.
Figure 20A:
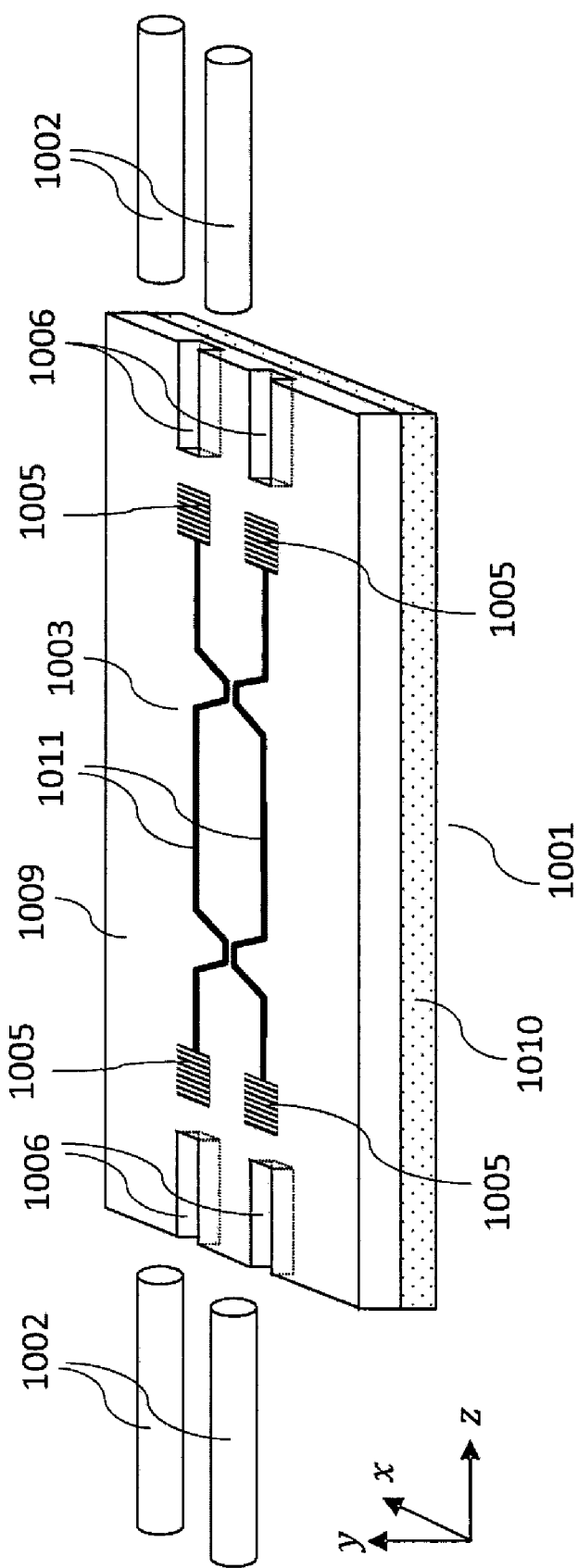
FIG. 20A is an exploded view of components of the optical connection structure before adhesion according to the tenth embodiment of the present invention.
Figure 20B:
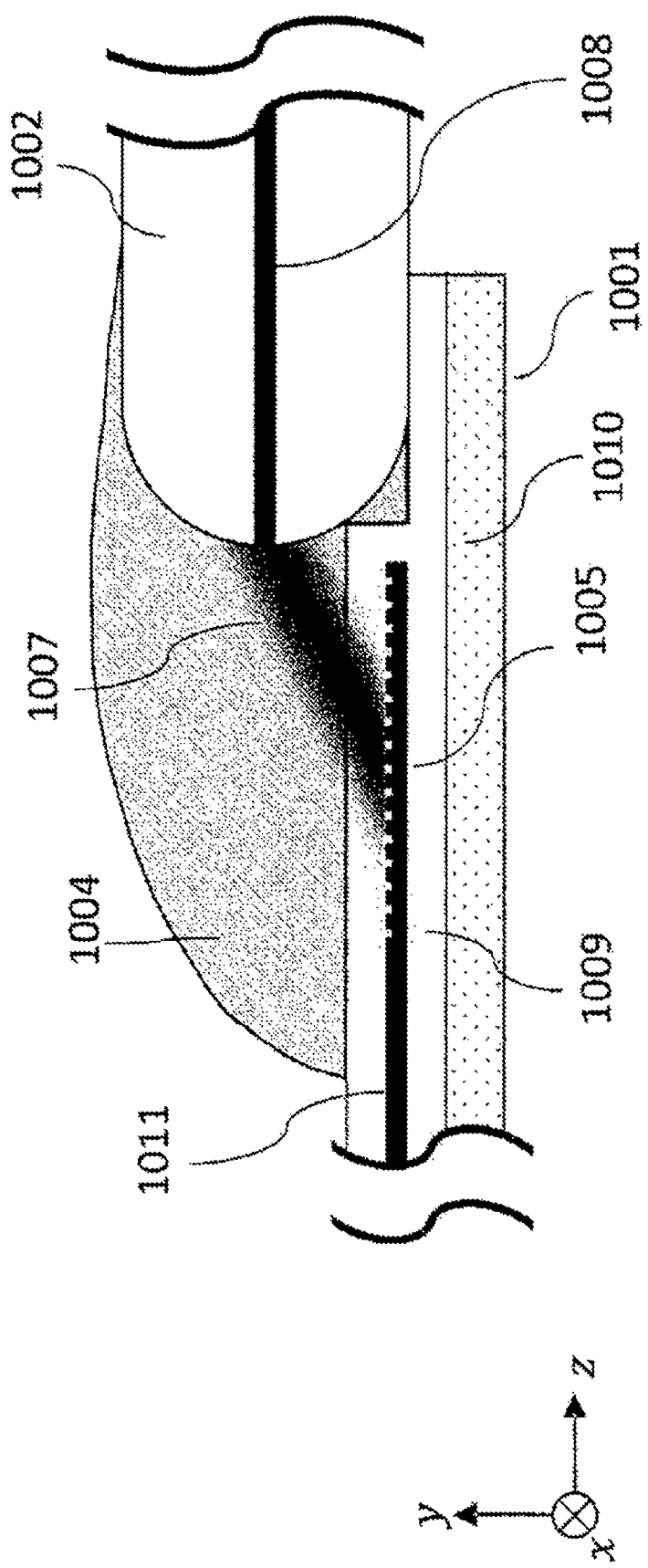
FIG. 20B is a sectional view of the optical connection structure before adhesion according to the tenth embodiment of the present invention.

Next, a tenth embodiment of the present invention will be described. FIGS. 19, 20A, and 20B are schematic diagrams illustrating an optical connection structure according to the tenth embodiment of the present invention. FIG. 19 is a perspective view of the optical connection structure, FIG. 20A is an exploded view of components of the optical connection structure before adhesion, and FIG. 20B is a sectional view of the optical connection structure cut along a yz plane.

Similarly to the first embodiment, a PLC 1001 that is an optical waveguide chip has a structure in which an optical waveguide 1003 and a grating coupler 1005 are formed on a substrate 1010. The optical waveguide 1003 includes a cladding layer 1009 and a core 1011 formed in the cladding layer 1009. Further, a grating coupler 1005 is formed in the cladding layer 1009, and the optical waveguide 1003 and the grating coupler 1005 are optically connected to each other. A lensed fiber 1002 is caused to adhere to a position near the grating coupler 1005 with an optical adhesive 1004 with a refractive index that is lower than that of the lensed fiber 1002. The lensed fiber 1002 is obtained by processing the distal end of the optical fiber to have a lens form.

As is obvious from the exploded view of components before adhesion illustrated in FIG. 20A, the optical waveguide 1003 and the grating coupler 1005 are formed on the PLC 1001. Further, a fitting groove 1006 to be fitted to the lensed fiber 1002 is formed in the cladding layer 1009 in the PLC 1001 from a position in the vicinity of the grating coupler 1005 to a position at which the fitting groove 1006 reaches an end surface of the PLC 1001 along an in-plane direction of the cladding layer 1009. The fitting groove 1006 is formed such that optimal optical coupling is achieved between the lensed fiber 1002 fitted into the fitting groove 1006 and the grating coupler 1005. This allows a physical aligning structure required for passive alignment to be implemented. Although a method for manufacturing the fitting groove 1006 is not particularly limited, it is possible to produce the fitting groove 1006 with precision required for passive alignment even in a case in which photolithography that is a typical PLC producing method is employed.

FIG. 20B is a sectional view of a state in which the lensed fiber 1002 is fitted into the fitting groove 1006 in the PLC 1001. An optical fiber core 1008 is formed in the lensed fiber 1002. As described above, the lensed fiber 1002 is caused to adhere to the PLC 1001 with an optical adhesive 1004 in a state in which the lensed fiber 1002 is fitted into the fitting groove 1006. With the aforementioned structure, optical coupling between the PLC 1001 and the lensed fiber 1002 is established by the light beam 1007 being emitted from the lensed fiber 1002 and being incident on the optical waveguide 1003 via the grating coupler 1005, or by light from the optical waveguide 1003 being emitted as the light beam 1007 from the grating coupler 1005 and being incident on the lensed fiber 1002.

In general, the diameter of the optical fiber core 1008, the cladding diameter of the lensed fiber 1002, the thickness of the cladding layer 1009 in the PLC 1001, and the position of the optical waveguide 1003 in the cladding layer 1009 in a y-axis direction (thickness direction) cannot be freely selected for some commercial reasons or for convenience of manufacturing. However, using the structure according to the embodiment enables optical coupling between the optical waveguide 1003 on the PLC 1001 and the optical fiber core 1008 of the lensed fiber 1002 by adjusting a coupling angle of the light beam 1007 at the grating coupler 1005 regardless of these physical dimensions.

Also, the PLC 1001 and the lensed fiber 1002 can be aligned using the fitting groove 1006 formed in the PLC 1001. Although the method for manufacturing the grating coupler 1005 and the fitting groove 1006 is not particularly designated in the present invention, the grating coupler 1005 and the fitting groove 1006 can be produced with high precision using photolithography, electron beam lithography, or the like, and precision of a physical structure required to realize passive alignment can be secured.

Also, according to the embodiment, it is possible to form a lens on an optical path by the lensed fiber 1002 and the optical adhesive 1004 with a refractive index that is lower than that of the lensed fiber 1002. With this structure, it is possible to collect light between the grating coupler 1005 and the optical fiber core 1008 of the lensed fiber 1002.

Thus, according to the embodiment, the optical connection between the PLC 1001 and the lensed fiber 1002 can be implemented using only passive alignment without using active alignment similarly to the first embodiment, and it is possible to reduce an installation time and installation cost as compared with the case in which active alignment is used. Also, according to the embodiment, it is possible to reduce a loss due to optical connection as compared with that in the first embodiment, by the lensed fiber 1002 and the optical adhesive 1004 with a refractive index that is lower than that of the lensed fiber 1002.

Eleventh Embodiment

Figure 21:
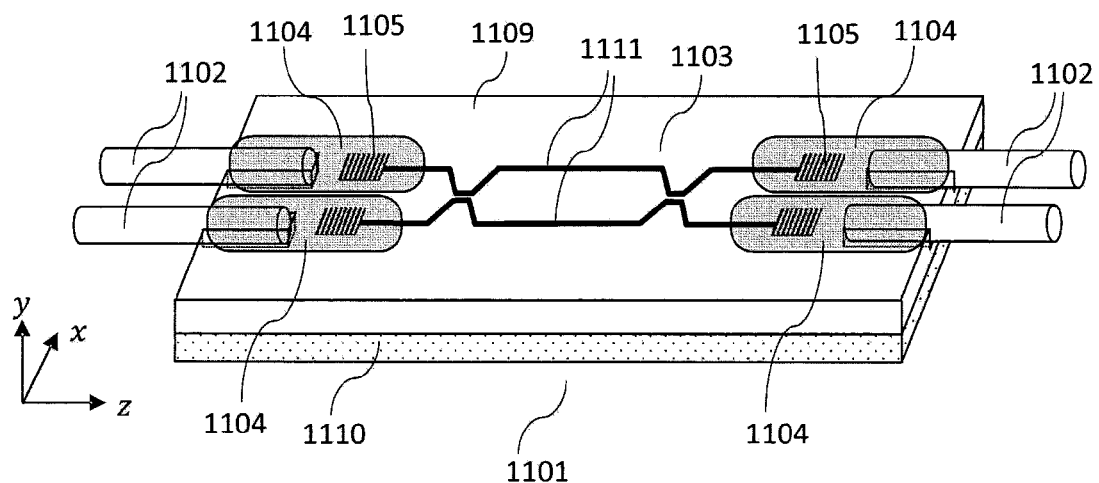
FIG. 21 is a schematic view illustrating an optical connection structure according to an eleventh embodiment of the present invention.
Figure 22A:
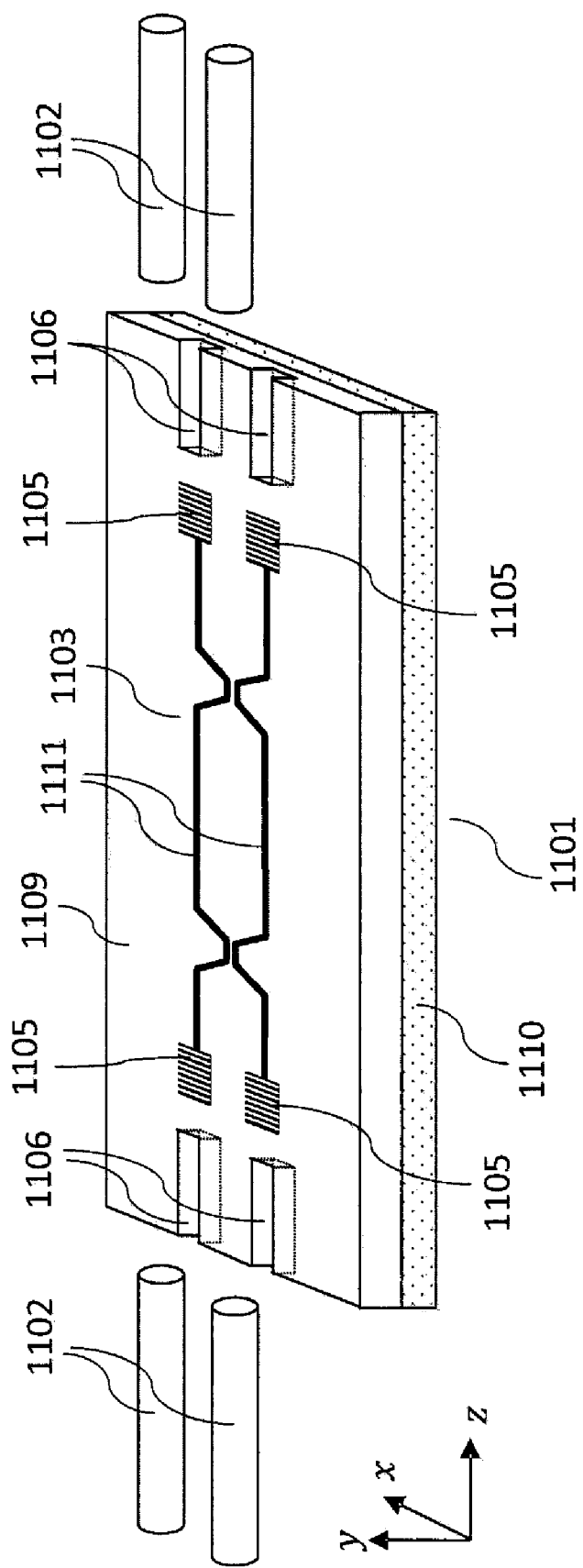
FIG. 22A is an exploded view of components of the optical connection structure before adhesion according to the eleventh embodiment of the present invention.
Figure 22B:
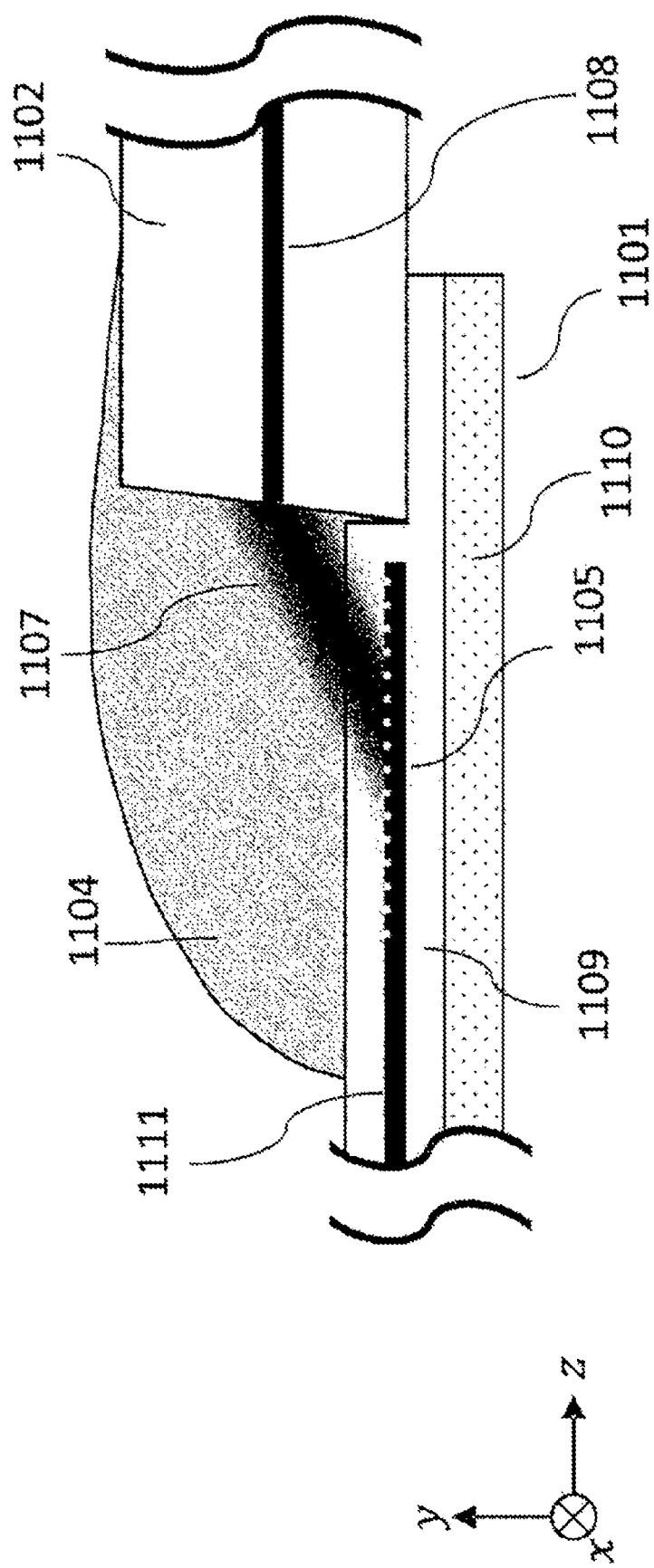
FIG. 22B is a sectional view of the optical connection structure before adhesion according to the eleventh embodiment of the present invention.
Figure 23:
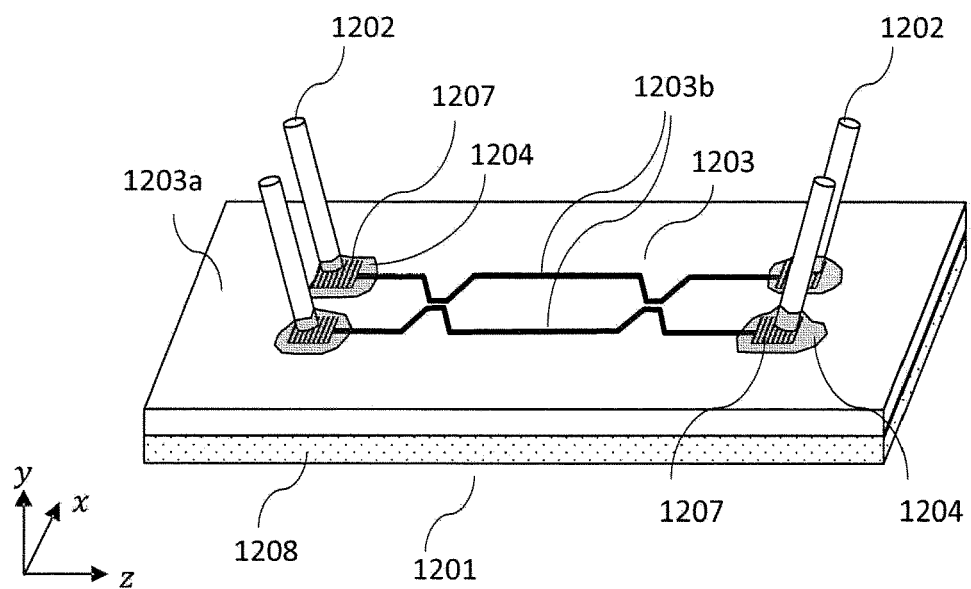
FIG. 23 is a perspective view illustrating an example of optical coupling in a direction that is substantially perpendicular to a waveguide direction of a PLC using a grating coupler.
Figure 24:
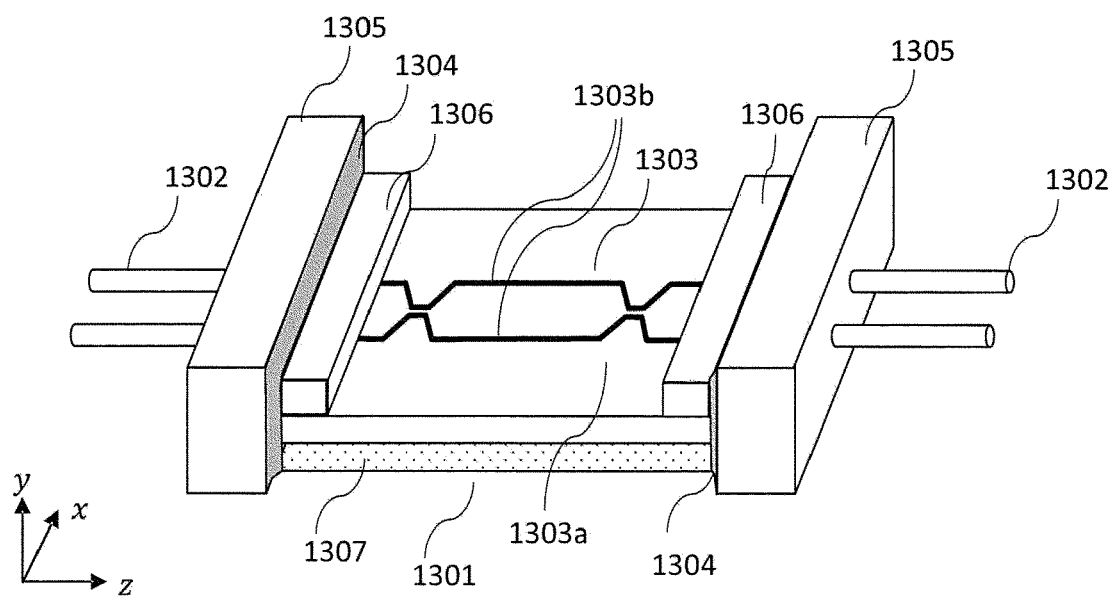
FIG. 24 is a perspective view illustrating an example of direct optical coupling in a PLC end surface.

Next, an eleventh embodiment of the present invention will be described. FIGS. 21, 22A, and 22B are schematic diagrams illustrating an optical connection structure according to the eleventh embodiment of the present invention. FIG. 21 is a perspective view of the optical connection structure, FIG. 22A is an exploded view of components of the optical connection structure before adhesion, and FIG. 22B is a sectional view of the optical connection structure cut along a yz plane.

Similarly to the first embodiment, a PLC 1101 that is an optical waveguide chip has a structure in which an optical waveguide 1103 and a grating coupler 1105 are formed on a substrate 1110. The optical waveguide 1103 includes a cladding layer 1109 and a core 1111 formed in the cladding layer 1109. Further, a grating coupler 1105 is formed in the cladding layer 1109, and the optical waveguide 1103 and the grating coupler 1105 are optically connected to each other. An obliquely cut fiber 1102 is caused to adhere to a position near the grating coupler 1105 with an optical adhesive 1104 with a refractive index that is lower than that of the obliquely cut fiber 1102. The obliquely cut fiber 1102 is obtained by obliquely cutting the end surface of the optical fiber.

As is obvious from the exploded view of components before adhesion illustrated in FIG. 22A, the optical waveguide 1103 and the grating coupler 1105 are formed on the PLC 1101. Further, a fitting groove 1106 to be fitted to the obliquely cut fiber 1102 is formed in the cladding layer 1109 in the PLC 1101 from a position in the vicinity of the grating coupler 1105 to a position at which the fitting groove 1106 reaches an end surface of the PLC 1101 along an in-plane direction of the cladding layer 1109. The fitting groove 1106 is formed such that optimal optical coupling is achieved between the obliquely cut fiber 1102 fitted into the fitting groove 1106 and the grating coupler 1105. This allows a physical aligning structure required for passive alignment to be implemented. Although a method for manufacturing the fitting groove 1106 is not particularly limited, it is possible to produce the fitting groove 1106 with precision required for passive alignment even in a case in which photolithography that is a typical PLC producing method is employed.

FIG. 22B is a sectional view of a state in which the obliquely cut fiber 1102 is fitted into the fitting groove 1106 in the PLC 1101. An optical fiber core 1108 is formed in the obliquely cut fiber 1102. As described above, the obliquely cut fiber 1102 is caused to adhere to the PLC 1101 with an optical adhesive 1104 in a state in which the obliquely cut fiber 1102 is fitted into the fitting groove 1106. With the aforementioned structure, optical coupling between the PLC 1101 and the obliquely cut fiber 1102 is established by the light beam 1107 being emitted from the obliquely cut fiber 1102 and being incident on the optical waveguide 1103 via the grating coupler 1105, or by light from the optical waveguide 1103 being emitted as the light beam 1107 from the grating coupler 1105 and being incident on the obliquely cut fiber 1102.

In general, the diameter of the optical fiber core 1108, the cladding diameter of the obliquely cut fiber 1102, the thickness of the cladding layer 1109 in the PLC 1101, and the position of the optical waveguide 1103 in the cladding layer 1109 in a y-axis direction (thickness direction) cannot be freely selected for some commercial reasons or for convenience of manufacturing. However, using the structure according to the embodiment enables optical coupling between the optical waveguide 1103 on the PLC 1101 and the optical fiber core 1108 of the obliquely cut fiber 1102 by adjusting a coupling angle of the light beam 1107 at the grating coupler 1105 regardless of these physical dimensions.

Also, the PLC 1101 and the obliquely cut fiber 1102 can be aligned using the fitting groove 1106 formed in the PLC 1101. Although the method for manufacturing the grating coupler 1105 and the fitting groove 1106 is not particularly designated in the present invention, the grating coupler 1105 and the fitting groove 1106 can be produced with high precision using photolithography, electron beam lithography, or the like, and precision of a physical structure required to realize passive alignment can be secured.

Also, according to the embodiment, it is possible to cause an angle formed between a cut surface normal vector and the light beam 1107 and an angle formed between the cut surface normal vector and the optical fiber core 1108 in the cut surface of the obliquely cut fiber 1102 to approach values that satisfy a Snell's law, by the obliquely cut fiber 1102 and the optical adhesive 1104 with a refractive index that is lower than that of the obliquely cut fiber 1102. With this configuration, it is possible to reduce an insertion loss of the light beam 1107 and the optical fiber core 1108.

Thus, according to the embodiment, the optical connection between the PLC 1101 and the obliquely cut fiber 1102 can be implemented using only passive alignment without using active alignment similarly to the first embodiment, and it is possible to reduce an installation time and installation cost as compared with the case in which active alignment is used. Also, according to the embodiment, it is possible to reduce a loss due to optical connection as compared with that in the first embodiment, by the obliquely cut fiber 1102 and the optical adhesive 1104 with a refractive index that is lower than that of the obliquely cut fiber 1102.

INDUSTRIAL APPLICABILITY

Embodiments of the present invention can be applied to techniques for connecting an optical waveguide chip and an optical fiber.

REFERENCE SIGNS LIST 101, 201, 301, 401, 501, 601, 701, 801, 901, 1001, 1101 PLC
102, 202, 302, 402, 502, 802, 902 Optical fiber
103, 203, 303, 403, 503, 603, 703, 803, 903, 1003, 1103 Optical waveguide
104, 204, 304, 404, 504, 604, 704, 804, 904, 1004, 1104 Optical adhesive
105, 205, 305, 405, 505, 605, 705, 805, 905, 1005, 1105 Grating coupler
106, 206, 306, 406, 506, 606, 706, 806, 906, 1006, 1106 Fitting groove
107, 207, 307, 407, 507, 607, 707, 807, 907, 1007, 1107 Light beam
108, 208, 308, 408, 508, 608, 708, 808, 908, 1008, 1108 Optical fiber core
109, 209, 309, 409, 509, 609, 709, 809, 909, 1009, 1109 Cladding layer
110, 210, 310, 410, 510, 610, 710, 810, 910, 1010, 1110 Substrate
111, 211, 311, 411, 511, 611, 711, 811, 911, 1011, 1111 Core
512 Coating for multiple-core fiber
602 Multicore optical fiber
702 Thermally-expanded core optical fiber
1002 Lensed fiber
1102 Obliquely cut fiber.

The invention claimed is:

1. An optical connection structure comprising:
an optical waveguide chip comprising an optical waveguide on a substrate, a grating coupler optically connected to the optical waveguide, and a groove; and
an optical fiber that is fitted into the groove of the optical waveguide chip, wherein the groove is disposed in a topmost surface of a cladding layer in which the optical waveguide is disposed, wherein the groove extends at least to a level of a bottom surface of the grating coupler, and wherein the optical fiber is optically connected to the grating coupler.

2. The optical connection structure according to claim 1, wherein the optical fiber adhered to the optical waveguide chip with an optical adhesive.

3. The optical connection structure according to claim 2, wherein the optical adhesive covers a distal end of the optical fiber fitted into the groove and covers the grating coupler.

4. The optical connection structure according claim 1, wherein the groove extends to an end surface of the optical waveguide chip along an in-plane direction of the cladding layer.

5. The optical connection structure according to claim 1, wherein:
the groove extends along an in-plane direction of the cladding layer to end of the groove at a position at which the groove does not reach an end surface of the optical waveguide chip; and
the optical fiber is fitted into the groove so as to be at a slanted include with respect to a surface of the optical waveguide chip on which the grating coupler is disposed.

6. The optical connection structure according to claim 5, wherein the groove has a planar shape in a top view, with a rectangular shape on a side closer to the grating coupler and an elliptical hemisphere shape on a side closer to the end surface of the optical waveguide chip, the planar shape being obtained by combining the rectangular shape and the elliptical hemisphere shape such that a width of the rectangular shape coincides with a shorter diameter of the elliptical hemisphere shape.

7. The optical connection structure according to claim 1, wherein the optical fiber is a thermally-expanded core optical fiber, a lensed fiber, an obliquely cut fiber, a multiple-core fiber, or a multicore fiber.

8. The optical connection structure according to claim 1, wherein the groove extends completely through the cladding layer and exposes a lower layer different from the cladding layer, the lower layer having an upper surface serving as a bottom surface of the groove.

9. A method comprising:
providing an optical waveguide chip comprising an optical waveguide on a substrate, a grating coupler optically connected to the optical waveguide, and a groove; and
fitting an optical fiber into the groove of the optical waveguide chip, wherein the groove is disposed in a topmost surface of a cladding layer in which the optical waveguide is disposed, wherein the groove extends at least to a level of a bottom surface of the grating coupler, and wherein the optical fiber is optically connected to the grating coupler.

10. The method according to claim 9, further comprising adhering the optical fiber into the groove of the optical waveguide chip with an optical adhesive.

11. The method according to claim 10, wherein the optical adhesive covers a distal end of the optical fiber fitted into the groove and covers the grating coupler.

12. The method according to claim 9, wherein the groove extends to an end surface of the optical waveguide chip along an in-plane direction of the cladding layer.

13. The method according to claim 9, wherein:
the groove extends along an in-plane direction of the cladding layer to end of the groove at a position at which the groove does not reach an end surface of the optical waveguide chip; and
the optical fiber is fitted into the groove so as to be at a slanted include with respect to a surface of the optical waveguide chip on which the grating coupler is disposed.

14. The method according to claim 13, wherein the groove has a planar shape in a top view, with a rectangular shape on a side closer to the grating coupler and an elliptical hemisphere shape on a side closer to the end surface of the optical waveguide chip, the planar shape being obtained by combining the rectangular shape and the elliptical hemisphere shape such that a width of the rectangular shape coincides with a shorter diameter of the elliptical hemisphere shape.

15. The method according to claim 9, wherein the optical fiber is a thermally-expanded core optical fiber, a lensed fiber, an obliquely cut fiber, a multiple-core fiber, or a multicore fiber.

16. The method according to claim 9, wherein the groove extends completely through the cladding layer and exposes a lower layer different from the cladding layer, the lower layer having an upper surface serving as a bottom surface of the groove.

* * * * *